(12) United States Patent
Aguaviva et al.

(10) Patent No.: US 8,436,870 B1
(45) Date of Patent: May 7, 2013

(54) USER INTERFACE AND METHOD FOR GRAPHICAL PROCESSING ANALYSIS

(75) Inventors: Raul Aguaviva, London (GB); Jeffrey T. Kiel, Raleigh, NC (US); Sebastien Julien Domine, San Jose, CA (US); William Orville Ramey, II, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 511 days.

(21) Appl. No.: 11/498,207

(22) Filed: Aug. 1, 2006

(51) Int. Cl.
*G06T 1/20* (2006.01)
*G06T 15/00* (2006.01)
*G06T 1/00* (2006.01)
*G09G 5/00* (2006.01)

(52) U.S. Cl.
USPC .......................... 345/619; 345/506; 345/522

(58) Field of Classification Search ................... 345/501, 345/522
See application file for complete search history.

(56) References Cited

U.S. PATENT DOCUMENTS

| | | | |
|---|---|---|---|
| 5,643,086 A | 7/1997 | Alcorn et al. | |
| 5,752,062 A * | 5/1998 | Gover et al. | 714/37 |
| 5,757,919 A | 5/1998 | Herbert et al. | |
| 5,815,154 A | 9/1998 | Hirschtick et al. | |
| 5,892,904 A | 4/1999 | Atkinson et al. | |
| 5,920,725 A | 7/1999 | Ma et al. | |
| 5,970,147 A | 10/1999 | Davis | |
| 5,978,484 A | 11/1999 | Apperson et al. | |
| 5,999,737 A | 12/1999 | Srivastava | |
| 6,016,474 A | 1/2000 | Kim et al. | |
| 6,157,618 A | 12/2000 | Boss et al. | |
| 6,266,416 B1 | 7/2001 | Sigbj.o slashed.msen et al. | |
| 6,330,008 B1 * | 12/2001 | Razdow et al. | 715/772 |
| 6,362,825 B1 | 3/2002 | Johnson | |
| 6,412,039 B1 | 6/2002 | Chang | |
| 6,668,325 B1 | 12/2003 | Collberg et al. | |
| 6,684,389 B1 | 1/2004 | Tanaka et al. | |
| 6,732,060 B1 | 5/2004 | Lee | |
| 6,901,582 B1 * | 5/2005 | Harrison | 717/127 |
| 6,943,800 B2 | 9/2005 | Taylor et al. | |
| 6,965,994 B1 | 11/2005 | Brownell et al. | |
| 7,016,972 B2 * | 3/2006 | Bertram et al. | 709/235 |
| 7,047,519 B2 | 5/2006 | Bates et al. | |
| 7,095,416 B1 * | 8/2006 | Johns et al. | 345/522 |
| 7,107,484 B2 | 9/2006 | Yamazaki et al. | |
| 7,173,635 B2 * | 2/2007 | Amann et al. | 345/660 |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 | 7/2008 | Chalfin et al. | |

(Continued)

OTHER PUBLICATIONS gDEBugger, graphicREMEDY, http://www.gremedy.com/, Aug. 7, 2006.

(Continued)

*Primary Examiner* — M Good Johnson

(57) ABSTRACT

A computer-implemented user interface and method for graphical processing analysis. More specifically, embodiments provide a convenient and effective mechanism for presenting GPU performance information such that one or more bottlenecking and/or underutilized graphics pipeline units may be identified. The presentation of the information enables quick comparison of all graphical operations within a frame for analysis with increased granularity. Additionally, the performance of graphical operations with common state attributes may be compared to more effectively and efficiently enhance GPU performance.

21 Claims, 19 Drawing Sheets

U.S. PATENT DOCUMENTS

| | | | |
|---|---|---|---|
| 7,401,242 | B2 | 7/2008 | Abernathy et al. |
| 7,420,563 | B2 * | 9/2008 | Wakabayashi ............ 345/440.1 |
| 7,505,953 | B2 * | 3/2009 | Doshi .............................. 707/1 |
| 7,555,499 | B2 * | 6/2009 | Shah et al. ................ 707/103 R |
| 7,765,500 | B2 | 7/2010 | Hakura et al. |
| 7,778,800 | B2 | 8/2010 | Aguaviva et al. |
| 7,891,012 | B1 | 2/2011 | Kiel et al. |
| 2001/0034835 | A1 | 10/2001 | Smith |
| 2001/0044928 | A1 | 11/2001 | Akaike et al. |
| 2002/0157086 | A1 | 10/2002 | Lewis et al. |
| 2002/0175839 | A1 | 11/2002 | Frey |
| 2003/0043022 | A1 | 3/2003 | Burgan et al. |
| 2003/0120935 | A1 | 6/2003 | Teal et al. |
| 2003/0214660 | A1 | 11/2003 | Plass et al. |
| 2004/0085894 | A1 | 5/2004 | Wang et al. |
| 2004/0130552 | A1 | 7/2004 | Duluk, Jr. et al. |
| 2004/0158824 | A1 | 8/2004 | Gennip et al. |
| 2004/0162989 | A1 | 8/2004 | Kirovski |
| 2005/0198051 | A1 | 9/2005 | Marr et al. |
| 2005/0222881 | A1 | 10/2005 | Booker |
| 2005/0243094 | A1 | 11/2005 | Patel et al. |
| 2005/0273652 | A1 | 12/2005 | Okawa et al. |
| 2005/0278684 | A1 | 12/2005 | Hamilton et al. |
| 2006/0047958 | A1 | 3/2006 | Morais |
| 2006/0079333 | A1 | 4/2006 | Morrow et al. |
| 2006/0080625 | A1 | 4/2006 | Bose et al. |
| 2006/0109846 | A1 | 5/2006 | Lioy et al. |
| 2006/0161761 | A1 | 7/2006 | Schwartz et al. |
| 2006/0185017 | A1 | 8/2006 | Challener et al. |
| 2007/0115292 | A1 | 5/2007 | Brothers et al. |
| 2007/0274284 | A1 | 11/2007 | Dendukuri et al. |
| 2008/0007563 | A1 | 1/2008 | Aronson et al. |
| 2008/0095090 | A1 | 4/2008 | Lee et al. |

OTHER PUBLICATIONS

A Relational Debugging Engine for the Graphics Pipeline, Duca et al., http://citeseer.ist.psu.edu/cache/papers/cs2/167/http:zSZzSzwww.cs.jhu.eduzSz~cohensSzPublicationszSzgldb. pdf/a-relational-debugging-engine.pdf International Conference on Computer Graphics and Interactive Techniques, ACM SIGGRAPH 2005, pp. 453-463, LA, ISSN: 0730-0301.

"maxVUE Grapic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

"ATI Radeon X800, 3D Architecture White Paper", ATI, 2005, pp. 1-13, with proof of seniority (4 pages), according to ACM bibliograghy regarding the document: "The Direct3D 10 System", ACM TOG, vol. 25, Iss. 3 (Jul. 2006), Reference 1; eHG.

N. Tatarchuk, "New RenderMonkey Features for DirectX and OpenGL Shader Development", Game Developers Conference, Mar. 2004.

gDebugger, graphicREMEDY, http://www.gremedy.com/, Jul. 29, 2005.

C. Cebenoyan and M. Wloka, "Optimizing the Graphics Pipeline", 2003, Nvidia GDC Presentation Slide.

Graphic Remedy; gDEBugger screen shots; pp. 1-18, date unknown.

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Hololulu, Hawaii, Apr. 16, 1996 Proceedings.

Josh Lessard, "Profiling Concurrent Programs Using Hardware Counters", May 2005, University of Waterloo, Thesis, (abridged copy provided).

* cited by examiner

USER INTERFACE AND METHOD FOR GRAPHICAL PROCESSING ANALYSIS

RELATED APPLICATIONS

The present application is related to U.S. patent application Ser. No. 11/498,229, filed Aug. 1, 2006, entitled "METHOD AND USER INTERFACE FOR ENHANCED GRAPHICAL OPERATION ORGANIZATION," naming Raul Aguaviva, Jeffrey Kiel, Sebastien Domine and Will Ramey as inventors, assigned to the assignee of the present invention. That application is incorporated herein by reference in its entirety and for all purposes.

The present application is related to U.S. patent application Ser. No. 11/497,863, filed Aug. 1, 2006, entitled "A METHOD AND SYSTEM FOR CALCULATING PERFORMANCE PARAMETERS FOR A PROCESSOR," naming Raul Aguaviva, Jeffrey Kiel and Sebastien Domine as inventors, assigned to the assignee of the present invention. That application is incorporated herein by reference in its entirety and for all purposes.

BACKGROUND OF THE INVENTION

The need to improve the efficiency of graphics processing units (GPUs) running graphical applications has always been a concern of software developers. For example, bottleneck analysis is important to optimizing an application given that a pipelined GPU is only as fast as its slowest pipeline unit. Similarly, it is desirable to monitor the utilization of each unit of a graphics pipeline, thereby allowing load spreading and ensuring sufficient utilization of each unit at any given time. However, optimizing GPU performance is a daunting task given the limited number of performance tools available, and the limited number of features that the conventional tools offer.

In an attempt to isolate a GPU bottleneck, conventional performance tools require the user to run a series of tests intended to target a suspect unit of the graphics pipeline. The tests may involve varying characteristics of the pipeline while processing data, where a variation in frame rate may indicate a bottleneck in a certain area of the pipeline. However, such tests are time consuming, tedious and often produce misleading and/or vague results given the dependency of various pipeline units on one another. Moreover, modern GPUs employ multiple pipelines for increased processing power, thereby presenting additional dependencies which make isolating a single bottlenecking unit very difficult.

In addition to bottleneck analysis, software developers are also concerned with equalizing and increasing utilization of the pipeline units. However, conventional performance tools fail to provide such information directly. As such, even if a bottlenecking unit is identified, any correction to reduce the bottleneck may negatively impact the utilization of other units. Thus, developers often encounter minimal performance gains even if a bottleneck is corrected given the inability to monitor utilization information pertaining to pipeline units.

In addition to the inadequacies discussed above, conventional performance tools commonly display performance data in terms of averages and transient, scrolling data. As such, granular GPU analysis regarding unit bottleneck and utilization at the graphical frame level, and further at the graphical operation level, is essentially impossible. Moreover, even if a developer is able to remedy a bottleneck and increase the utilization of an under-utilized unit for a given frame or graphical operation, performance for other frames and/or graphical operations may decrease. Thus, much time and effort is likely to be spent using conventional performance tools with little or no appreciable increase in the performance of the graphical application on a given GPU.

SUMMARY OF THE INVENTION

Accordingly, a need exists to provide software developers with information about a pipelined GPU executing a graphical application such that a bottlenecking unit or units may be more accurately identified. Additionally, a need exists to provide software developers with information about a pipelined GPU executing a graphical application such that an under-utilized unit or units may be identified. Further, a need exists to provide such information for graphical operations within a given graphical frame such that the efficiency of a graphics processing unit may be further increased. Embodiments of the present invention provide novel solutions to these needs and others as described below.

Embodiments of the present invention are directed to a computer-implemented user interface and method for graphical processing analysis. More specifically, embodiments provide a convenient and effective mechanism for presenting GPU performance information such that one or more bottlenecking and/or underutilized graphics pipeline units may be identified. The presentation of the information enables quick comparison of all graphical operations within a frame for analysis with increased granularity. Additionally, the performance of graphical operations with common state attributes may be compared to more effectively and efficiently enhance GPU performance.

In one embodiment, a computer-implemented user interface for graphical processing analysis includes a first window for displaying a plurality of graphical operations, and for providing for a selection of a selected portion of the plurality of graphical operations. The user interface also includes a second window for displaying performance data for the selected portion of the plurality of graphical operations in response to the selection, wherein the performance data indicates a degree to which a unit of a graphics processing pipeline impedes a flow of data through the graphics processing pipeline upon execution of the selected portion of the plurality of graphical operations.

In another embodiment, a computer-implemented user interface for graphical processing analysis comprises a first window for displaying a plurality of graphical operations, and for providing for a selection of a selected portion of the plurality of graphical operations. The user interface also includes a second window for displaying performance data for the selected portion of the plurality of graphical operations in response to the selection, wherein the performance data indicates utilization information for a unit of a graphics processing pipeline upon execution of the selected portion of the plurality of graphical operations.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
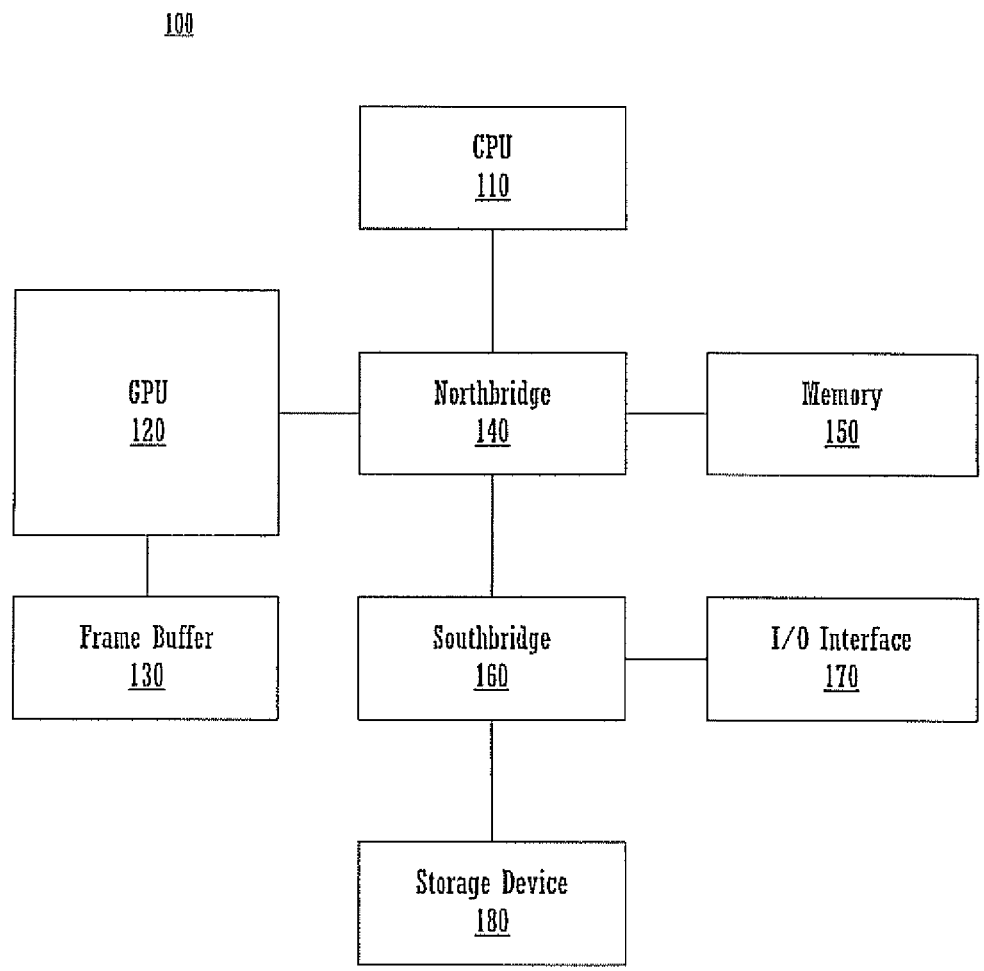
FIG. 1 shows an exemplary computer system platform in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "identifying," "defining," "determining," "performing," "processing," "comparing," "repeating," "creating," "modifying," "assigning," "moving," "establishing," "using," "calculating," "adding," "accessing," "generating," "accepting," "grouping," "displaying," "sorting," "depicting," "assigning," "programming," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

FIG. 1 shows exemplary computer system 100 in accordance with one embodiment of the present invention. As shown in FIG. 1, computer system 100 depicts components of a basic computer system that provides the execution platform for implementing hardware-based and software-based functionality described herein. Certain processes and steps of the present invention are realized, in one embodiment, as a series of instructions (e.g., a software application) that reside within computer-readable memory (e.g., 140) and/or a coupled storage device (e.g., 170) and are executed by the CPU (e.g., 110) of a computer system (e.g., 100). When executed, the instructions cause computer system 100 to implement the functionality of the embodiments of the present invention as described herein.

As shown in FIG. 1, computer system platform 100 comprises northbridge component 140 for coupling CPU 110 to system memory 150 and graphics processing unit (GPU) 120. GPU 120 comprises a portion of at least one graphics pipeline for processing graphical operations to render graphical data for display (e.g., on a display device coupled to computer system 100, etc.). The rendered data may be stored within frame buffer 130 for access by components of computer system 100 and/or other systems. Additionally, computer system 100 comprises southbridge component 160 coupled to northbridge component 140 for enabling the reading and writing of data to storage device 170. Further, southbridge component 160 enables computer system 100 to communicate with other systems or devices via I/O interface 180.

In one embodiment of the present invention, computer system 100 may be implemented as a desktop computer system or server computer system having one or more powerful general-purpose CPU 110 removably-coupled with a motherboard. A graphics card may couple to the motherboard for performing graphics processing tasks, where the graphics card may comprise GPU 120 and/or frame buffer 130. Alternatively, frame buffer 130 may be removably coupled with the graphics card to enable variation of frame buffer size, memory type, etc. for varying graphics performance. Similarly, GPU 120 may be removably-coupled with the graphics card.

Alternatively, computer system 100 may be implemented as a set-top video game console device such as, for example, the Xbox 360™, available from Microsoft Corporation of Redmond, Wash., or the Playstation® 3 available from Sony Computer Entertainment Corporation of Tokyo, Japan. Further, computer system 100 may be implemented as a portable computing system such as a laptop computer, personal digital assistant (PDA), cellular phone, etc.

Although computer system 100 is depicted in FIG. 1 with certain components to simplify the discussion, it should be understood that computer system 100 may comprise additional and/or alternative components, devices, buses, etc. in other embodiments. Additionally, it should be appreciated that elements of computer system 100 may be alternatively grouped (e.g., southbridge 160 integrated with northbridge 140, etc.). Additionally, although elements of computer system 100 are depicted as a discrete components in FIG. 1, it should be appreciated that they may be alternatively implemented as a discrete integrated circuit dies (e.g., mounted directly on the motherboard, graphics card, etc.), or as components included within the integrated circuit die of a computer system chipset component (e.g., integrated within northbridge 140, southbridge 160, etc.).

Figure 2:
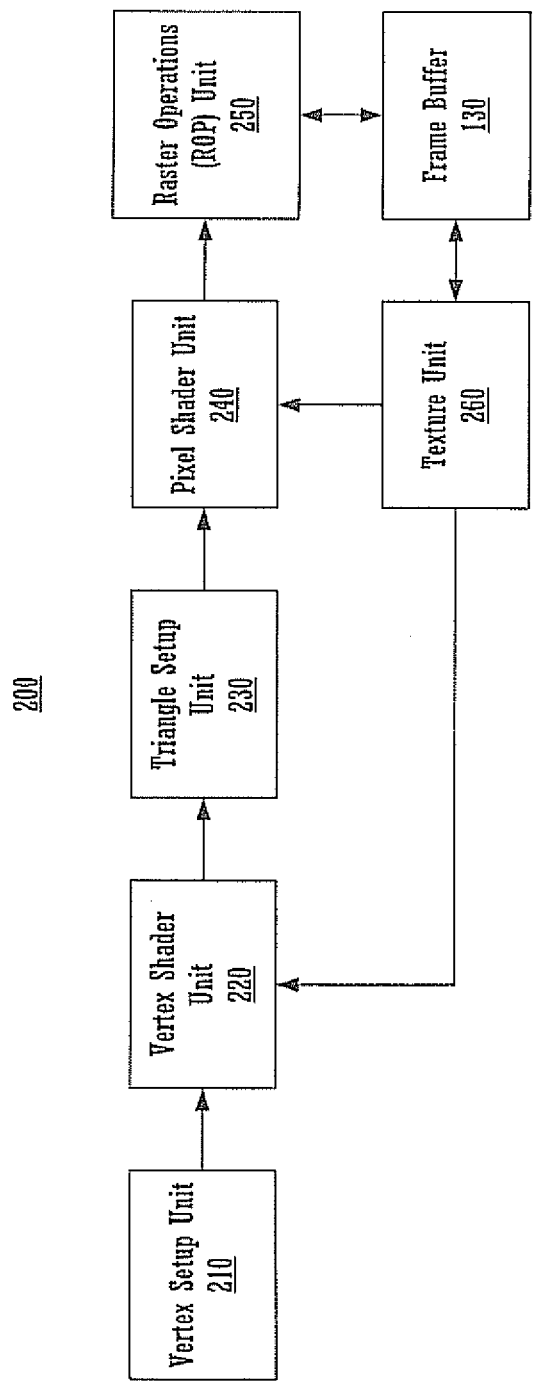
FIG. 2 shows an exemplary graphics processing pipeline in accordance with one embodiment of the present invention.

FIG. 2 shows exemplary graphics processing pipeline 200 in accordance with one embodiment of the present invention. As shown in FIG. 2, pipeline 200 consists of multiple units that process and convey data to perform graphics rendering tasks defined by graphical operations, which may comprise "draw calls." For example, a data stream may be generated by an application programming interface (API) (e.g., Direct3D, OpenGL, etc.) and sent to vertex setup unit 210, which may then feed data to vertex shader unit 220 before entering triangle setup unit 230. After leaving triangle setup unit 230, the data may be conveyed to pixel shader unit 240 and into raster operations (ROP) unit 250. Further, while data flows from vertex setup unit 210 to ROP unit 250, data may be read from and written to frame buffer 130 by ROP unit 250 and/or texture unit 260. Similarly, data may also be conveyed from texture unit 260 to pixel shader unit 240 and/or vertex shader unit 220. As such, work may be performed in parallel by units of pipeline 200, thereby increasing efficiency and graphics processing performance.

As shown in FIG. 2, vertex setup unit 210 receives vertices from the CPU (e.g., 110 of FIG. 1) and assembles all the data required for vertex shader unit 220 to run a given vertex program. For example, vertex setup unit 210 may gather information about a given vertex, which may include its position, normal, color, smoothing attributes, etc. Once this information is assembled, it is passed to the vertex shader unit 220 where a vertex program is run to transform the vertices from model space to camera space, calculate lighting, perform skinning, change the shape or size of the primitive being drawn, change the position or orientation of the primitive being drawn, etc. Using information from vertex shader unit 220, the triangle setup unit 230 may then collect and convert the vertices into triangles. The triangles are then assembled such that they may effectively be converted to pixels by later states of pipeline 200.

Data from triangle setup unit 230 is fed to pixel shader unit 240 for application of pixel shader programs to pixels associated with the triangles. For example, pixel shader programs may perform per-pixel lighting, bump mapping, etc., where the pixel shader programs may access pixel shader constants during execution. Pixel shader unit 240 may output to several (e.g., four) render targets or separate buffers, where the render targets may be accessed for later use (e.g., input as textures, combined, displayed, etc.). Thereafter, the data stream is fed to ROP unit 250 for performing blending operations with what is currently within frame buffer 130. The blending may be performed in accordance with blending settings (e.g., alpha blending enabled, alpha test enabled, alpha test value, stencil enabled, etc.) provided to ROP unit 250. After rasterization operations are performed by ROP unit 250, the data may be written to frame buffer 130.

Given that data is passed from one unit to another within pipeline 200, units of pipeline 200 may operate in parallel. For example, while vertex setup unit 210 is gathering information for vertex shader unit 220, texture unit 260 may communicate with frame buffer 130 and send texture data to vertex shader unit 220. Similarly, texture unit 260 may communicate with frame buffer 130 and send texture data to pixel shader unit 240 while triangle setup unit 230 assembles triangles to be shaded. As such, pipeline 200 offers software developers the flexibility and adaptability needed to increase the efficiency and utilization of each unit of the pipeline such that graphical applications perform well on GPU 120.

Depending upon how a graphical operation needs to use a specific unit of a graphics pipeline, the unit can be programmed to operate in accordance with different rendering states (or "states"). A state is defined by one or more state attributes used by the graphical operation, where the state may be programmed by changing one or more state attributes used by the graphical operation. Additionally, the state may be unit-specific, where the state attributes defining the state correspond to one unit of the graphics pipeline. Alternatively, a given state may apply to multiple units, where the state attributes defining the state correspond to more than one unit of the graphics pipeline.

Although pipeline 200 is depicted in FIG. 2 with specific pipeline units, it should be appreciated that a larger or smaller number of units may be used in other embodiments. Additionally, the units of pipeline 200 may be alternatively grouped and/or coupled in other embodiments. Moreover, it should be appreciated that units of pipeline 200 may be implemented by hardware and/or software, where hardware-implemented portions may be implemented on one or more components of computer system 100 (e.g., GPU 120, CPU 110, etc.).

Figure 3:
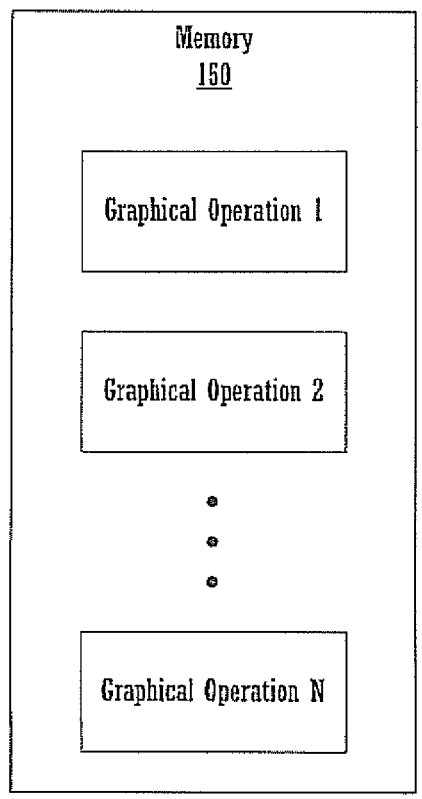
FIG. 3 shows an exemplary memory diagram comprising graphical operations in accordance with one embodiment of the present invention.

FIG. 3 shows exemplary memory diagram 150 comprising graphical operations in accordance with one embodiment of the present invention. As shown in FIG. 3, memory 150 may comprise multiple graphical operations (e.g., draw calls, etc.) for processing by a graphics processing pipeline (e.g., 200 of FIG. 2). The graphical operations may be part of one or more graphical applications, where the processing of the graphical operations generates performance data. As such, software developers may use the performance data to streamline their applications in an attempt to optimize them and improve processing on a given GPU.

Figure 4:
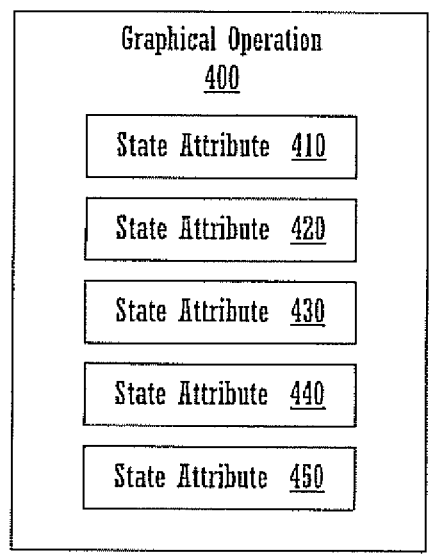
FIG. 4 shows an exemplary graphical operation in accordance with one embodiment of the present invention.

FIG. 4 shows exemplary graphical operation 400 in accordance with one embodiment of the present invention. As shown in FIG. 4, graphical operation 400 (e.g., stored within memory 150 of FIG. 3) comprises state attributes 410-450 for programming or setting the pipeline up to process data fed through one or more pipeline units. The state attributes may be any information used by a unit of a graphics pipeline (e.g., 200) that controls how that unit processes a data stream fed through the graphics pipeline. For example, state attributes used by the pixel shader unit may comprise pixel shader programs, pixel shader constants, render target information, graphical operation parameters, etc. As such, state attributes may direct the pixel shader unit to shade certain pixels and how to shade the pixels using a given pixel shader program, group of pixel shader constants, etc.

Although graphical operation 400 is shown with only five state attributes, it should be appreciated that it may contain a larger or smaller number of state attributes in other embodiments. Moreover, although a single graphical operation is shown in FIG. 4, it should be appreciated that one or more graphical operations may share the same state attributes.

Grouping of Graphical Operations with Common State Attributes

Figure 5:
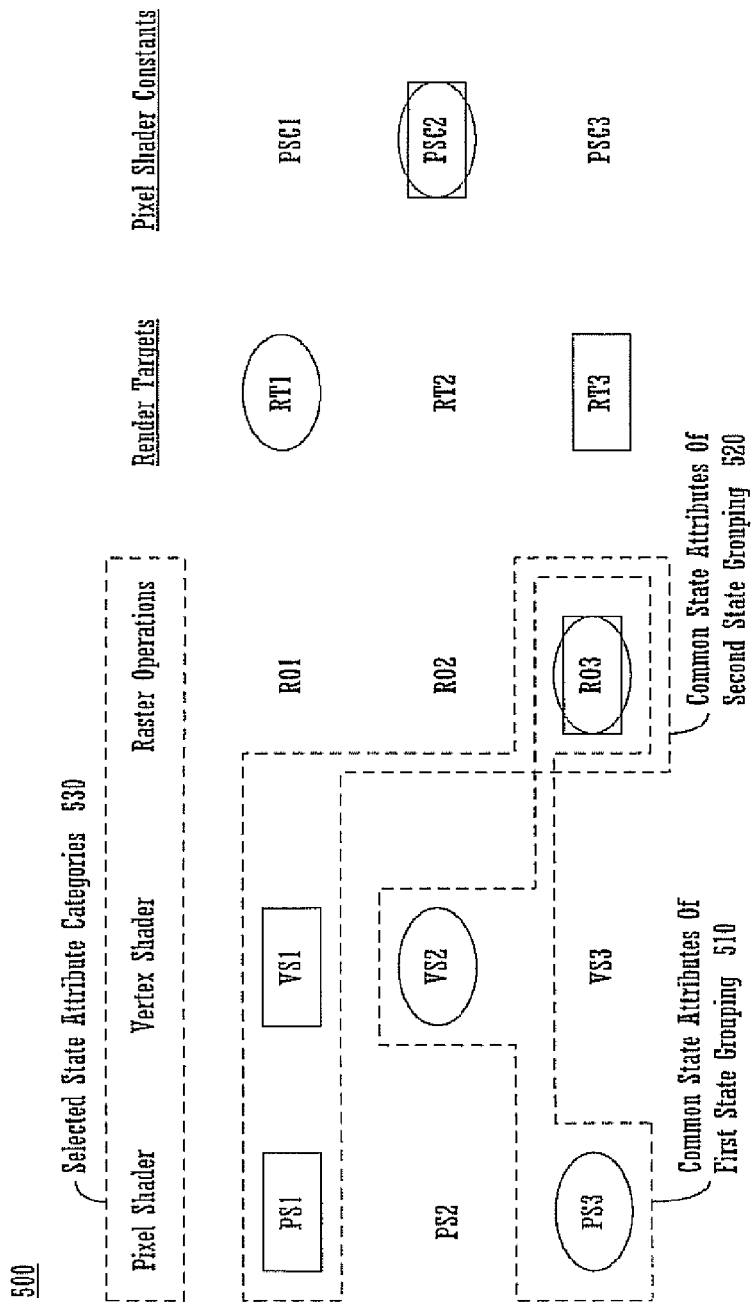
FIG. 5 shows a block diagram depicting state attributes defining exemplary state groupings in accordance with one embodiment of the present invention.

FIG. 5 shows block diagram 500 depicting state attributes defining exemplary state groupings in accordance with one embodiment of the present invention. As shown in FIG. 5, a plurality of state attributes are grouped into categories, where each category comprises three state attributes. For example, pixel shader attributes PS1, PS2 and PS3 may be pixel shader programs for controlling how pixels of a primitive are shaded. Vertex shader attributes VS1, VS2 and VS3 may be vertex shader programs for controlling how vertices are shaded. Raster operations attributes RO1, RO2 and RO3 may be blending settings for controlling how pixel shader data (e.g., from pixel shader unit 240 of FIG. 2) is blended with existing pixel data held in the frame buffer (e.g., 130 of FIG. 2). Render target attributes RT1, RT2 and RT3 may be render target settings (e.g., number of render targets used, a unique identifier of active render targets, etc.) used by various units of the graphics pipeline (e.g., 200 of FIG. 2) processing a graphical operation associated with such a render target attribute. Additionally, pixel shader constant attributes PSC1, PSC2 and PSC3 may be groups of pixel shader constants for controlling how pixel shader programs shade certain pixels. In other embodiments, a larger or smaller number of state attributes and/or state attribute categories may be used, where state attributes may be used by other units (e.g., the texture unit, etc.) of the graphics processing pipeline.

Accordingly, state attributes of a graphical operation (e.g., 400 of FIG. 4) being processed influence how units of the graphics pipeline process the data fed to the unit. For example, a first graphical operation may comprise a first set of state attributes (e.g., state attributes PS3, VS2, RO3, RT1 and PSC2 encompassed by an oval), whereas a second graphical operation may comprise a second set of state attributes (e.g., state attributes PS1, VS1, RO3, RT3 and PSC2 encompassed by a rectangle). Thus, units of a graphics pipeline may process the first and second graphical operations similarly for shared state attributes (e.g., RO3 and PSC2) and differently for state attributes that are not shared between the graphical operations (e.g., PS3, VS2 and RT1 associated with the first graphical operation and PS1, VS1 and RT3 associated with the second graphical operation).

Since graphical operations with similar state attributes are processed similarly by units of the graphics processing pipeline, it is advantageous to group graphical operations sharing common state attributes (e.g., into state groupings) such that a tweak or modification to one graphical operation of a state grouping may similarly benefit other graphical operations of the same state grouping. For example, the first graphical operation may be grouped into a first state grouping with other graphical operations sharing common state attributes 510. Similarly, the second graphical operation may be grouped into a second state grouping with other graphical operations sharing common state attributes 520. As such, the first and second state groupings provide valuable information to the software developer about how the graphics pipeline (e.g., 200 of FIG. 2) will process the graphical operations.

For example, time and money may be wasted when tweaking two graphical operations of the same state grouping given the possibility that a first tweak may reduce the effectiveness of the second tweak (e.g., taking into account that the operations may be processed similarly by the graphics processing pipeline). As such, it can be more advantageous to tweak a graphical operation from each state grouping (e.g., the first and second graphical operations) since one tweak is less likely to reduce the effectiveness of another given the processing differences between state groupings. Moreover, a tweak to one graphical operation of a state grouping may benefit others of the same state grouping, thereby increasing the number of graphical operations benefited by the same number of tweaks. Thus, time and money is saved when using state groupings of graphical operations to make performance enhancements to a graphical application.

As shown in FIG. 5, the state attributes associated with each state grouping were pulled from selected state attribute categories 530. For example, the first state grouping comprises graphical operations with common state attributes 510 (e.g., PS3, VS2 and RO3), where common state attributes 510 fall with selected state attribute categories 530 (e.g., pixel shader attributes, vertex shader attributes and raster operations attributes). Similarly, the second state grouping comprises graphical operations with common state attributes 520 (e.g., PS1, VS1 and RO3), where common state attributes 520 also fall with selected state attribute categories 530 (e.g., pixel shader attributes, vertex shader attributes and raster operations attributes).

Accordingly, the number and type of common state attributes that graphical operations of a state grouping will share may be varied by selecting different combinations of state attribute categories, where this selection may be manual (e.g., by a user) or automatic (e.g., by a hardware or software component). For example, if only the pixel shader and vertex shader attribute categories were selected in another embodiment, the first state grouping (e.g., into which the first graphical operation may be placed) would share at least the state attributes PS3 and VS2, whereas the second state grouping (e.g., into which the first graphical operation may be placed) would share at least the state attributes PS1 and VS1. Alternatively, if only the raster operations and pixel shader constant state attribute categories were selected, then both the first and second graphical operations would be grouped together in the same state grouping given that each shares a common state attribute (e.g., RO3 and PSC2) from each of the selected categories. As such, state attributes (e.g., associated with graphical operations being grouped) that fall within non-selected state attribute categories may be ignored.

In addition to varying the number and type of shared state attributes for each state grouping, the selection of different state attribute categories may alter the number of graphical operations within each state grouping. For example, a selection of an additional state attribute category may reduce the number of graphical operations within a given state grouping given that all graphical operations within that state grouping must share an additional state attribute (e.g., from the additional selected attribute category). As such, the number of graphical operations within a state grouping can be decreased while increasing the similarity of the grouped graphical operations, thereby increasing the likelihood that a modification to a graphical operation will similarly benefit other graphical operations of the state grouping.

Moreover, by selecting specific categories, a developer is able to determine how the graphical operations are similar, thereby providing additional insight and control for further enhancement to the graphical application. For example, if it is determined that a specific graphics processing pipeline unit is causing processing inefficiency or some other performance drawback, state attribute categories related to that unit may be selected to group graphical operations which most heavily influence that unit's performance. The number of selected attribute categories can then be varied to change the number and processing similarity of the grouped graphical operations. As such, a minimal number of coding modifications may be performed to the state grouping of graphical operations, where the modifications are likely to create a significant performance improvement given the processing similarity of the grouped graphical operations.

Although the preceding discussion refers to a selection of state attribute categories by a software developer, it should be appreciated that the selection may be made manually by a user or automatically by a coding algorithm (e.g., residing within storage device 180, memory 150, etc. of FIG. 1). It should also be appreciated that the coding algorithm making the selection may be part of an application separate from the graphical application to which performance enhancements and graphical operation modifications are being made.

Figure 6:
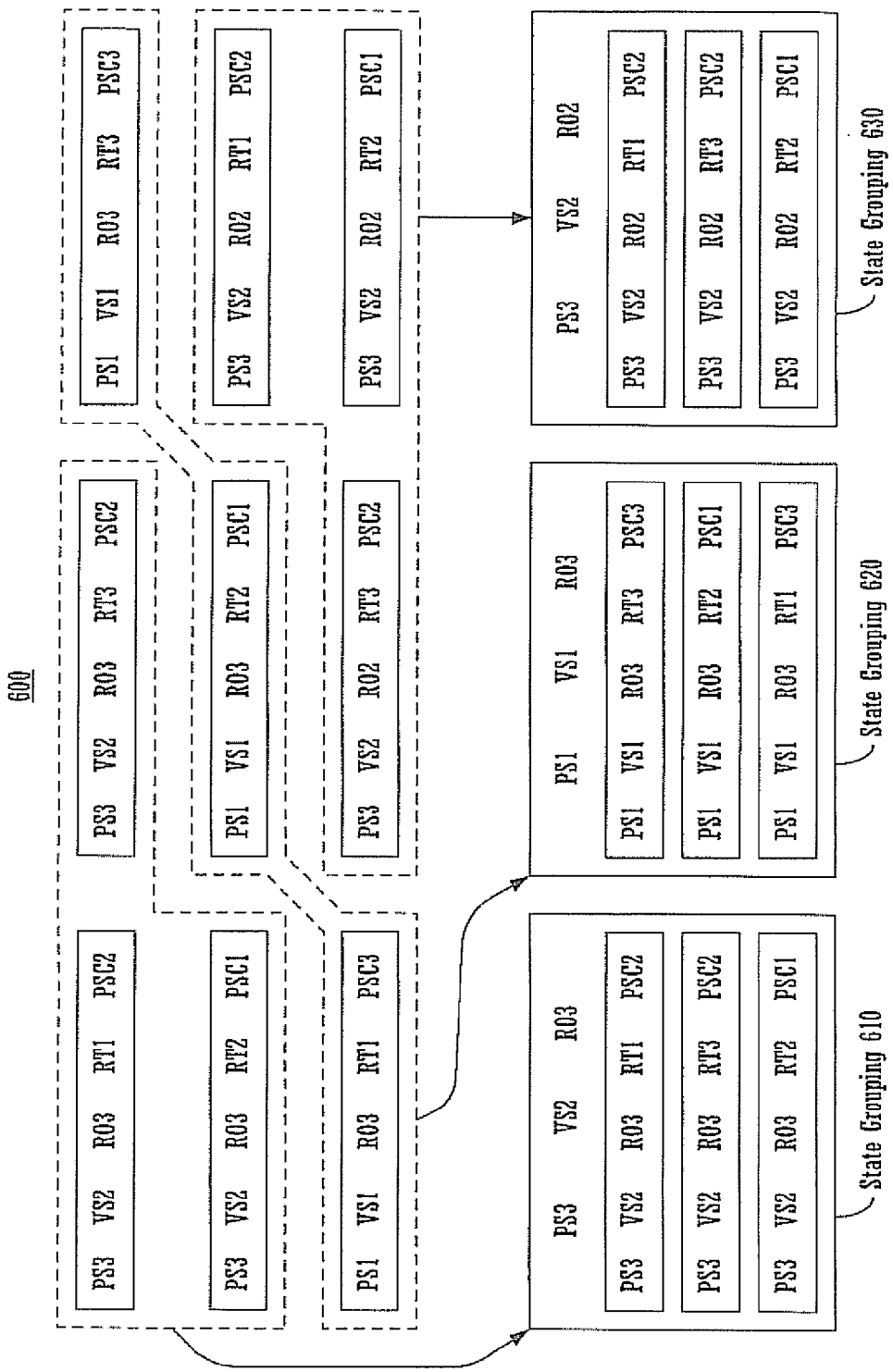
FIG. 6 shows a block diagram depicting exemplary state groupings comprising graphical operations with common state attributes in accordance with one embodiment of the present invention.

FIG. 6 shows block diagram 600 depicting exemplary state groupings comprising graphical operations with common state attributes in accordance with one embodiment of the present invention. As shown in FIG. 6, a plurality of graphical operations (e.g., those contained within memory 150 of FIG. 3) may be grouped into state groupings 610-630. The graphical operations within state grouping 610 are all associated with state attributes PS3, VS2 and RO3. State grouping 620 comprises graphical operations with associated state attributes PS1, VS1 and RO3. Additionally, the graphical operations within state grouping 630 are all associated with state attributes PS3, VS2 and RO2.

As shown in FIG. 6, the graphical operations are automatically grouped based on common state attributes within a given set of state attribute categories (e.g., 530 of FIG. 5). As such, although graphical operations within different state groupings may share attributes outside of selected state attribute categories, only graphical operations sharing state attributes within the selected categories are grouped. For example, the bottom-most graphical operations of state groupings 610 and 630 share four of the five state attributes depicted, but share only two (e.g., PS3 and VS2) of the three state attributes within the selected attribute categories. As such, the graphical operations are placed into different state groupings.

Although FIG. 6 depicts a specific number of graphical operations, state groupings, and graphical operations per state grouping, it should be appreciated that a larger or smaller number may be involved in other embodiments. Additionally, it should be appreciated that a larger or smaller number of selected state attribute categories may be used in other embodiments, and that a variation in the number of selected state attribute categories can affect the number of state groupings and graphical operations within each of the resulting state groupings.

Figure 7:
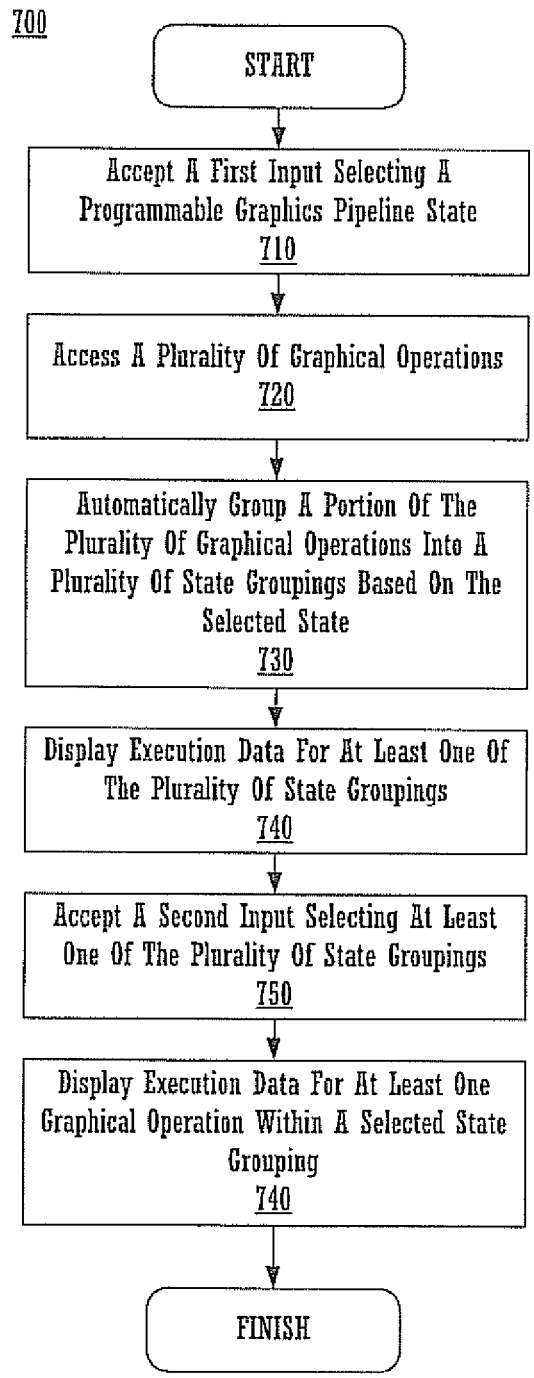
FIG. 7 shows an exemplary computer-implemented process for automatically organizing graphical operations into state groupings and displaying associated performance information in accordance with one embodiment of the present invention.

FIG. 7 shows exemplary computer-implemented process 700 for automatically organizing graphical operations into state groupings and displaying associated performance information in accordance with one embodiment of the present invention. As shown in FIG. 7, step 710 involves accepting a first input selecting a programmable graphics pipeline state. The first input may be either a manual (e.g., user) input or an input generated automatically by a hardware or software component. The state of the graphics processing pipeline (e.g., 200 of FIG. 2) may be a composite state comprising a plurality of states associated with one or more units of the pipeline, where each unit's state is determined by state attributes (e.g., those shown in FIG. 5). As such, the first input may comprise a selection of one or more state attribute categories as described above with respect to FIG. 5, where the selected attribute categories (e.g., 530) denote state attributes which define each unit's state. Alternatively, the first input may be a selection of specific state attributes for defining a state.

After selecting a graphics pipeline state, a plurality of graphical operations are accessed in step 720. The accessed graphical operations may comprise those of a frame of a graphical application. Additionally, the graphical operations may be stored in a computer system memory (e.g., 150 of FIGS. 1 and 3) for access by a GPU (e.g., 120) and for use in conjunction with processing a data stream. Each graphical operation may comprise one or more state attributes (e.g., 410-450) for defining a state of a pipeline unit.

As shown in FIG. 7, step 730 involves automatically grouping one or more of the accessed graphical operations into a plurality of state groupings based on the state attributes defining the state selected in step 710. The state groupings may comprise graphical operations with common state attributes, where one or more of the common state attributes are those that define the selected state.

After grouping the graphical operations into a plurality of state groupings, execution data is displayed in step 740 for at least one state grouping such that a graphical operation having significant execution time may be identified. The execution data may comprise execution times for one or more state groupings, where the execution time for a state grouping may be the sum of the execution times for one or more graphical operations making up the state grouping. Alternatively, the execution data may comprise pixel quantities for one or more state groupings, where the pixel quantity for a state grouping may be the sum of the pixel quantities associated with one or more of the graphical operations making up the state grouping. Additionally, the data may be automatically sorted or ranked to uniquely depict the state grouping with the largest execution time and/or the largest number of associated pixels. Alternatively, the data may be manually sorted by a user based on identifiers representing the state groupings and/or execution data corresponding to the state groupings.

As shown in FIG. 7, step 750 involves accepting a second input selecting at least one of the plurality of state groupings formed in step 730. The second input may be either a manual (e.g., user) input or an input generated automatically by a hardware or software component.

In response to the second input, execution data is displayed in step 760 for at least one graphical operation within a state grouping selected in step 750 such that a largest decrease in processing performance may be identified. The execution data may comprise execution times for one or more graphical operations. Alternatively, the execution data may comprise pixel quantities associated with one or more graphical operations. Further, the execution data may comprise graphical object (e.g., primitives, etc.) quantities associated with one or more graphical operations. Additionally, the data may be automatically sorted to uniquely depict the graphical operation with the largest execution time, largest number of associated pixels and/or the largest number of associated graphical objects. Alternatively, the data may be manually sorted by a user based on identifiers representing the graphical operations and/or execution data corresponding to the graphical operations.

Figure 8A:
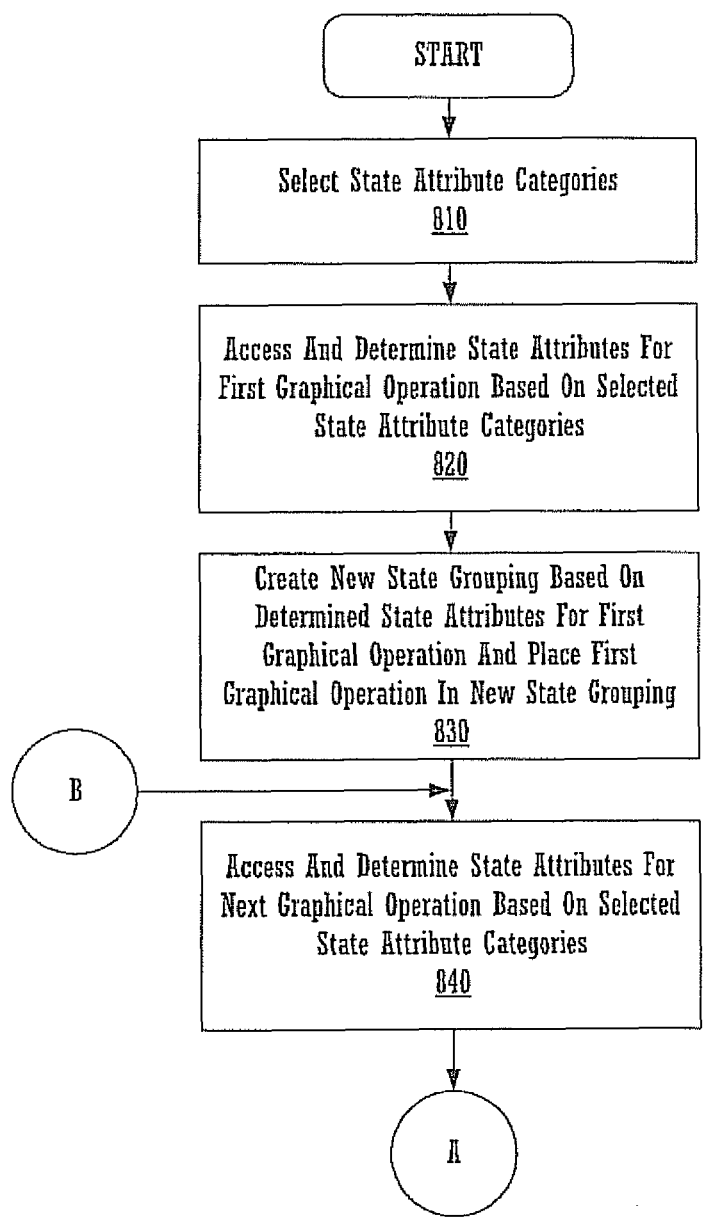
FIG. 8A shows an exemplary first portion of a computer-implemented process for organizing graphical operations into state groupings in accordance with one embodiment of the present invention.
Figure 8B:
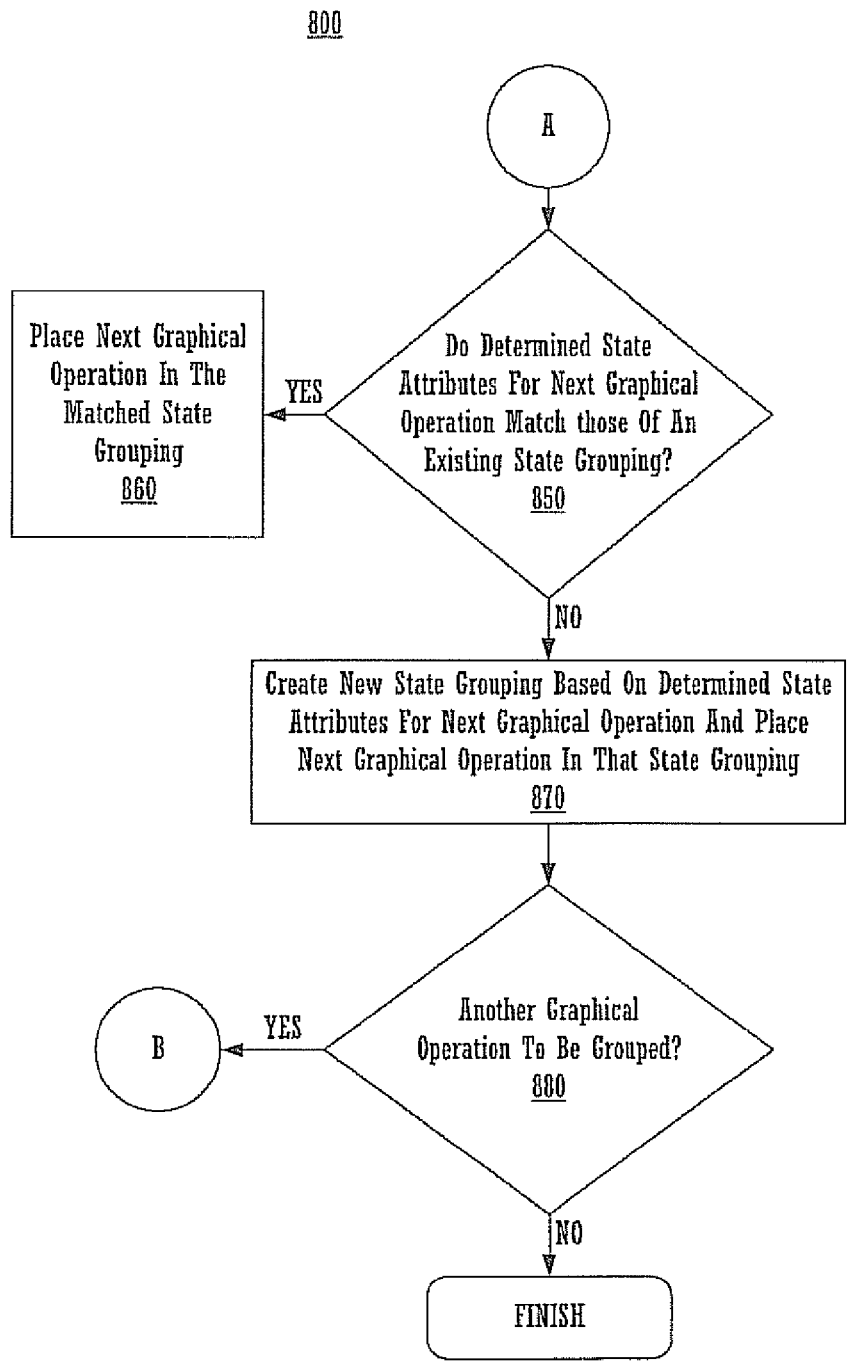
FIG. 8B shows an exemplary second portion of a computer-implemented process for organizing graphical operations into state groupings in accordance with one embodiment of the present invention.

FIGS. 8A and 8B show exemplary computer-implemented process 800 for organizing graphical operations into state groupings in accordance with one embodiment of the present invention. As shown in FIG. 8A, step 810 involves selecting a plurality of state attribute categories as described above with respect to FIG. 5, where the selected attribute categories (e.g., 530) organize state attributes for defining a state of each unit of a graphics processing pipeline.

As shown in FIG. 8A, step 820 involves accessing and determining state attributes for a first graphical operation based on the state attribute categories selected in step 810. As such, the determined state attributes are those of the graphical operation that fall within selected state attribute categories. For example, referring back to FIG. 5, the determined state attributes for the first graphical operation can be PS3, VS2 and RO3 since these state attributes fall within selected state attribute categories 530 and are associated with the first graphical operation.

After determining state attributes for a first graphical operation, a new state grouping may be created for the first graphical operation and the first graphical operation may be placed into that grouping in step 830. Thereafter, step 840 involves accessing and determining state attributes for a next graphical operation based on the state attribute categories selected in step 810. As such, the determined state attributes are those of the graphical operation that fall within selected state attribute categories. For example, referring back to FIG. 5, the determined state attributes for the next (e.g., second) graphical operation can be PS1, VS1 and RO3 since these state attributes fall within selected state attribute categories 530 and are associated with the second graphical operation.

As shown in FIG. 8B, a determination is made in step 850 as to whether the state attributes for the next graphical operation determined in step 840 match those of an existing state grouping. If the determined state attributes for the next graphical operation are found to match those of an existing state grouping, then the next graphical operation may be placed in that state grouping in step 860. Alternatively, if the determined state attributes for the next graphical operation do not match an existing state grouping, a new state grouping may be created for the next graphical operation and the next graphical operation may be placed into that grouping in step 870.

Step 880 involves making a determination as to whether another graphical operation exists which has not yet been grouped. If another graphical operation which has not yet been grouped is found, then steps 840 through 870 may be performed again for that graphical operation. If another graphical operation to be grouped is not found, then process 800 may terminate.

Figure 9:
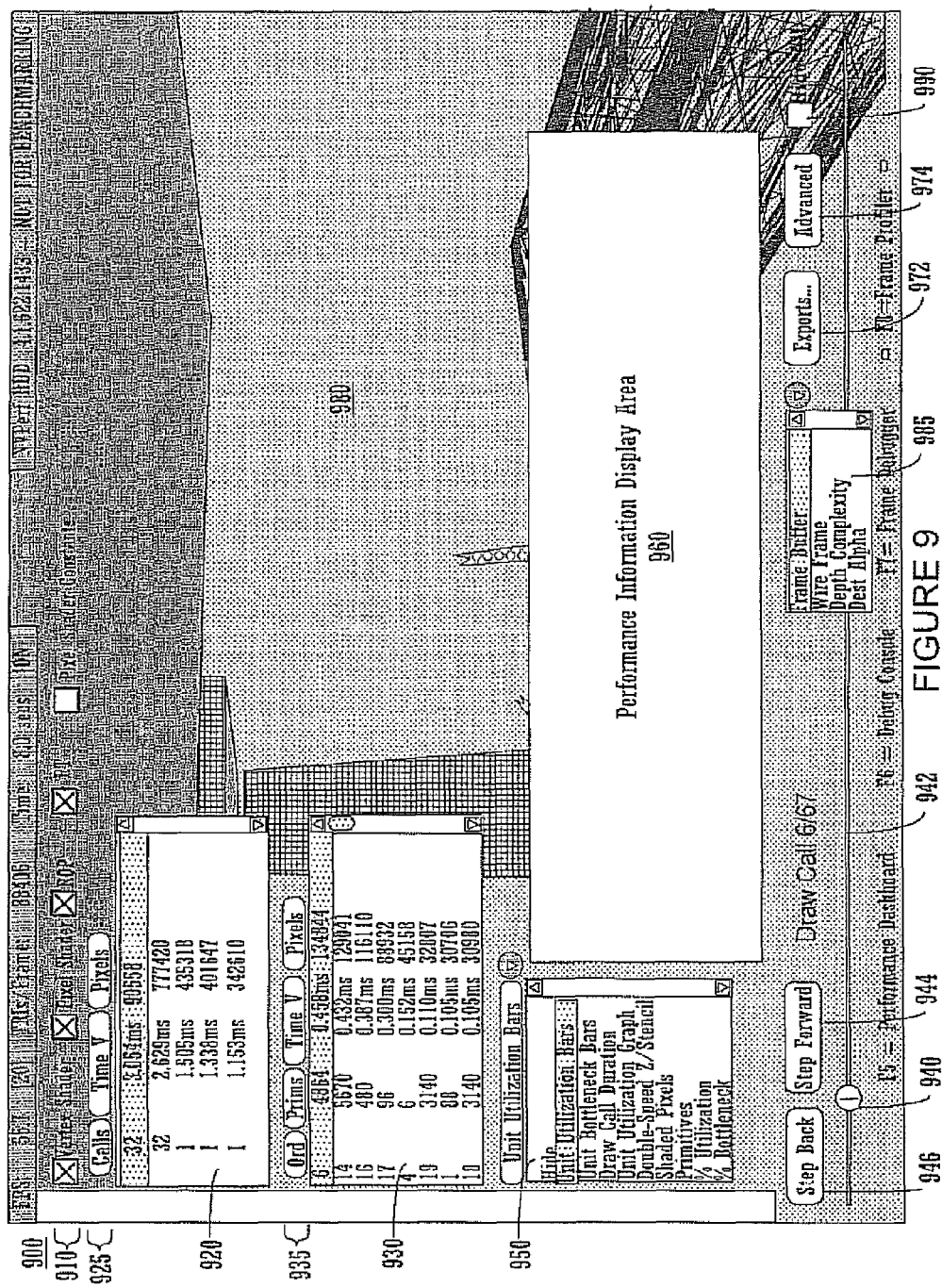
FIG. 9 shows an exemplary computer-implemented user interface for organizing graphical operations and displaying associated performance information in accordance with one embodiment of the present invention.

FIG. 9 shows exemplary computer-implemented user interface 900 for organizing graphical operations and displaying associated performance information in accordance with one embodiment of the present invention. As shown in FIG. 9, user interface 900 comprises a plurality of selectable elements 910 (e.g., icons with labels) for selecting a programmable state associated with one or more units of a graphics processing pipeline. Each element may correspond to a state attribute category, such that selection of an element selects a state attribute category. As such, one or more selectable elements may be selected to automatically group graphical operations into a plurality of state groupings as discussed above with respect to FIGS. 5, 6, 7, 8A and 8B.

As shown in FIG. 9, selectable elements 910 may comprise graphical elements within a single window. Alternatively, elements 910 may comprise one or more windows with graphical elements disposed therein. Alternatively, elements 910 may comprise one or more selectable buttons, icons, or the like. As such, the selection of one or more of elements 910 may be initiated by a user interacting with user interface 900 (e.g., with an input device, etc.). Alternatively, the selection may be made automatically by a hardware or software component, where the component initiating the selection may be associated with an application generating user interface 900.

Window 920 depicts a listing of execution data for a plurality of state groupings, where each row of the execution data corresponds to a different state grouping. Each state grouping listed in window 920 may contain a plurality of graphical operations with one or more common state attributes, where all the graphical operations of all state groupings may comprise a graphical frame in one embodiment. The first column in window 920 lists a number of graphical operations for each state grouping. The second column lists an execution time for the state grouping, where the execution time for the state grouping may be the sum of the execution times for one or more graphical operations making up the state grouping. The third column lists a pixel quantity for the state grouping, where the pixel quantity for the state grouping may be the sum of the pixel quantities associated with one or more of the graphical operations making up the state grouping.

As shown in FIG. 9, user interface 900 comprises sorting elements 925 for manually sorting the execution data within window 920. A sorting element is provided for each of the respective columns of execution data for sorting the rows of execution data based upon the data with a column corresponding to a selected or activated sorting element. Alternatively, the execution data displayed within window 920 may be automatically sorted (e.g., to uniquely depict or highlight the state grouping with the largest execution time and/or the largest number of associated pixels). The automatic sorting and display of the execution data in window 920 may be in response to a selection of one or more of selectable elements 910.

Window 930 depicts a listing of execution data for a plurality of graphical operations, where each row of the execution data corresponds to a different graphical operation. The graphical operations listed in window 930 may share one or more common state attributes, where the graphical operations may form a state grouping (e.g., one listed and selected in window 920). The first column in window 930 lists graphical operation numbers to serve as identifiers for each graphical operation for which execution data is listed in window 930. The second column lists a graphical object (e.g., primitives, etc.) quantity for each graphical operation. The third column lists an execution time for each graphical operation. The fourth column lists a pixel quantity for each graphical operation.

As shown in FIG. 9, user interface 900 comprises sorting elements 935 for manually sorting the execution data within window 930. A sorting element is provided for each of the respective columns of execution data for sorting the rows of execution data based upon the data with a column corresponding to a selected or activated sorting element. Alternatively, the execution data displayed within window 930 may be automatically sorted (e.g., to uniquely depict or highlight the graphical operation with the largest number of graphical objects, the largest execution time and/or the largest number of associated pixels). The automatic sorting and display of the execution data in window 930 may be in response to a selection of one or more of selectable elements 910. Alternatively, the execution data displayed within window 930 may be automatically sorted in response to a selection of one or more state grouping depicted within window 920.

Accordingly, user interface 900 provides a convenient and efficient tool for grouping graphical operations into state groupings which share one or more common state attributes, where such a grouping enhances graphical application performance analysis. Additionally, user interface 900 enables the regrouping of graphical operations based upon a different combination of selected state attribute categories, thereby enabling the variation of the number and type of shared state attributes for each state grouping, as well as the number and processing similarity of graphical operations within each state grouping. Further, user interface 900 displays execution data for state groupings and graphical operations within a state grouping, thereby enabling the identification of state groupings and/or graphical operations causing significant performance decreases in the graphical application.

Display of Performance Information for Graphics Processing Analysis

As shown in FIG. 9, in addition to organizing and displaying state groupings of graphical operations with common state attributes, user interface 900 provides several ways to identify one or more graphical operations such that corresponding performance information may be displayed (e.g., in performance information display area 960). In other embodiments, multiple display areas may be used, where each area may display different performance information. The performance information (e.g., as displayed in FIGS. 11 through 17) corresponding to one or more identified graphical operations may provide insight into how one or more units of a graphics processing pipeline (e.g., 200 of FIG. 2) are processing a data steam (e.g., a graphical application) fed through the graphics pipeline. Additionally, a display of a portion of the identified graphical operations is provided (e.g., in window 980) such that additional insight into the data stream may be gained. As such, user interface 900 provides various types and forms of information about a data stream fed through a graphics processing pipeline, thereby enabling analysis and modification of the data stream to increase processing performance.

As shown in FIG. 9, one or more graphical operations may be identified by selecting an identifier in window 920 corresponding to a graphical operation state grouping. Alternatively, a selection of an identifier in window 930 corresponding to a graphical operation of a state grouping may identify the selected graphical operation. A graphical operation may also be identified by moving slider 940 along slider path 942 to cycle through a grouping (e.g., a graphical frame) of graphical operations. Slider 940 may be moved by activating (e.g., placing a mouse cursor over slider 940 and depressing a mouse button) the slider and dragging it (e.g., with a movement of the mouse) it along slider path 942. Additionally, a graphical operation may be identified by selecting either the step forward button 944 or the step backward button 946, where the buttons may cause the identification of a graphical operation at a predetermined offset from a currently-identified frame within a graphical operation ordering (e.g., as defined by a graphical frame).

A graphical operation may also be automatically identified in response to a selection or activation of one or more elements of user interface 900. For example, the selection of one or more of selectable elements 910 may cause a state grouping (e.g., in window 920) and/or graphical operation within the state grouping (e.g., in window 930) to be automatically identified (e.g., to uniquely depict a grouping and/or graphical operation causing a largest decrease in processing performance). Alternatively, an identification of a state grouping within window 920 may cause one or more graphical operations within the identified state grouping to be identified (e.g., in window 930).

As shown in FIG. 9, the display of performance data within display area 960 may be modified by drop-down menu 950. In response to a selection of a menu item of menu 950, a different depiction of the performance data corresponding to the selected menu item may be displayed. A portion of each depiction (e.g., as shown in FIGS. 11 through 17) may present different performance data, or alternatively, depict similar performance data in a different form (e.g., bar graph, line graph, etc.).

Export button 972 provides the ability to export execution and performance information for viewing in alternative forms. The exported data may form text and/or graphical images. As such, another application and/or user interface may be used to access and present the exported data.

Advanced button 974 enables the presentation of additional information (e.g., in a separate pop-up window) relating to the processing of the data stream by various pipeline units of the graphics processing pipeline. The information may be used to gain additional insight into the processing of the data stream such that modifications can be made to state attributes defining the state of one or more pipeline units.

In addition to presenting execution and performance data for a given graphical operation and/or state grouping of graphical operations, user interface 900 also provides a graphical rendering in window 980 of the one or more identified graphical operations. Elements and/or windows of user interface 900 may overlay portions of window 980, thereby obscuring one or more portions of the underlying rendering. Selection of selectable element 990 may hide a predetermined number or amount of the windows and/or elements to enable additional viewing area for the rendering. Alternatively, the rendering may be displayed in a separate window and/or element of user interface 900.

As shown in FIG. 9, the rendering depicted in window 980 may be modified by drop-down menu 985. In response to a selection of a menu item of menu 985, a different depiction of rendering information corresponding to the selected menu item may be displayed. For example, data within the frame buffer corresponding to one or more identified graphical operations may be displayed within window 980. Alternatively, rendering information corresponding to one or more identified graphical operations may be displayed, where the rendering information comprises one or more rendered objects in a wireframe view. And in other embodiments, other selections from menu 985 may enable the display of other characteristics (e.g., depth complexity, alpha channel for the frame buffer, etc.) of rendered objects corresponding to one or more identified graphical operations.

Figure 10:
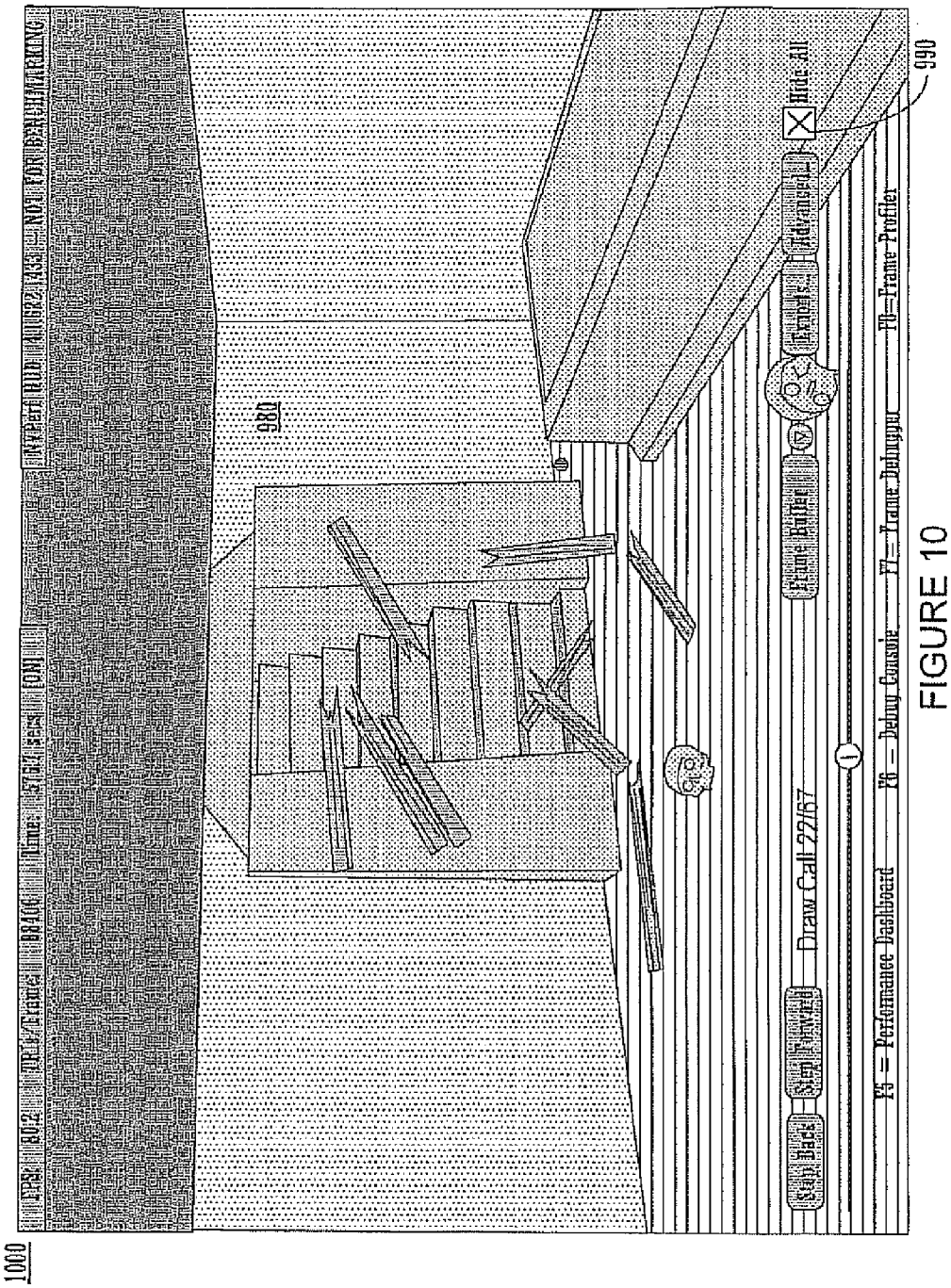
FIG. 10 shows an exemplary computer-implemented user interface with hidden portions in accordance with one embodiment of the present invention.

FIG. 10 shows exemplary computer-implemented user interface 1000 with hidden portions in accordance with one embodiment of the present invention. User interface 1000 is analogous to user interface 900 except that selectable element 990 is selected in user interface 1000 to hide certain windows and elements of user interface 900. For example, selectable elements 910, sorting elements 925, window 920, sorting elements 935, window 930, menu 950 and display area 960 may be hidden to generate user interface 1000. As such, the display area of window 980 is increased in response to hiding windows and elements of the user interface.

Figure 11:
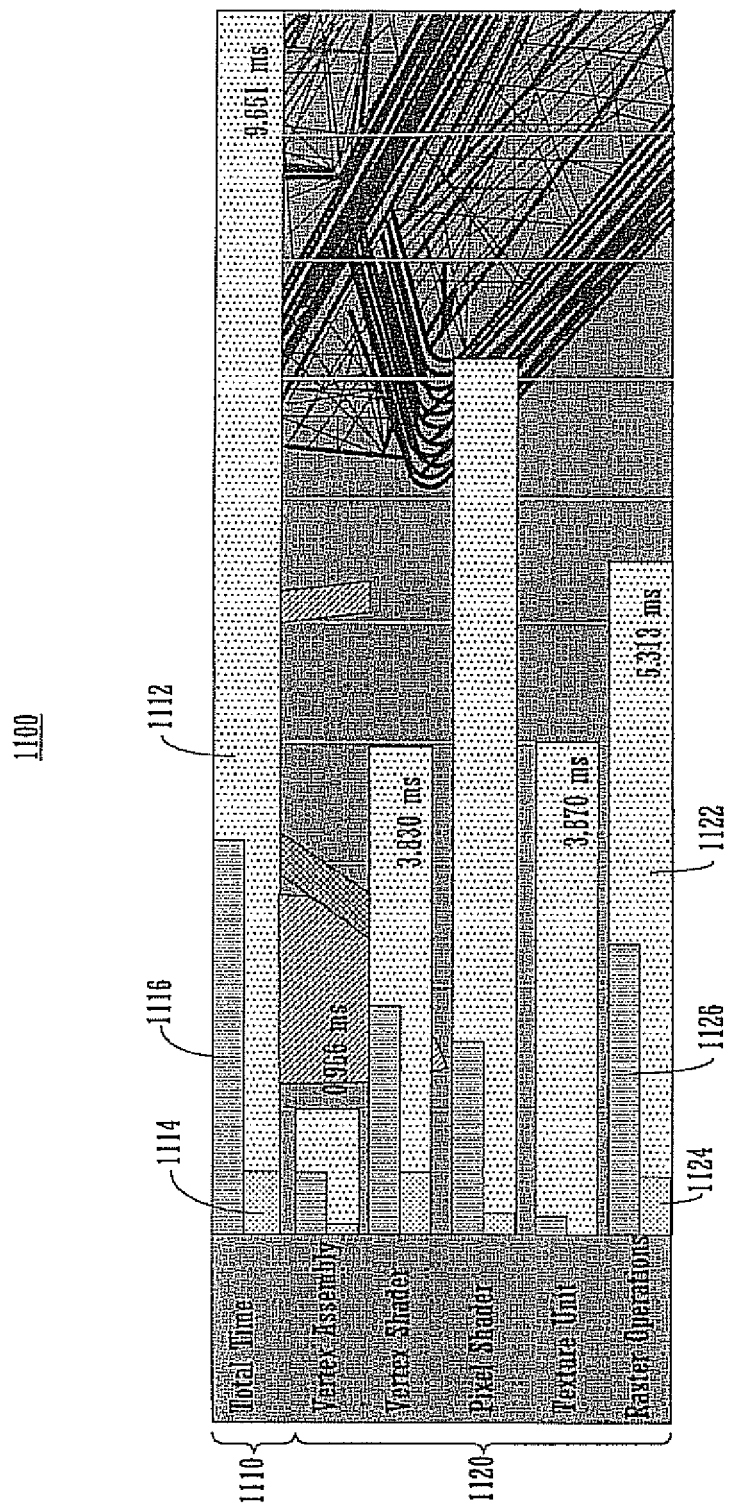
FIG. 11 shows exemplary data flow impedance information in units of time for bottleneck analysis in accordance with one embodiment of the present invention.
Figure 12:
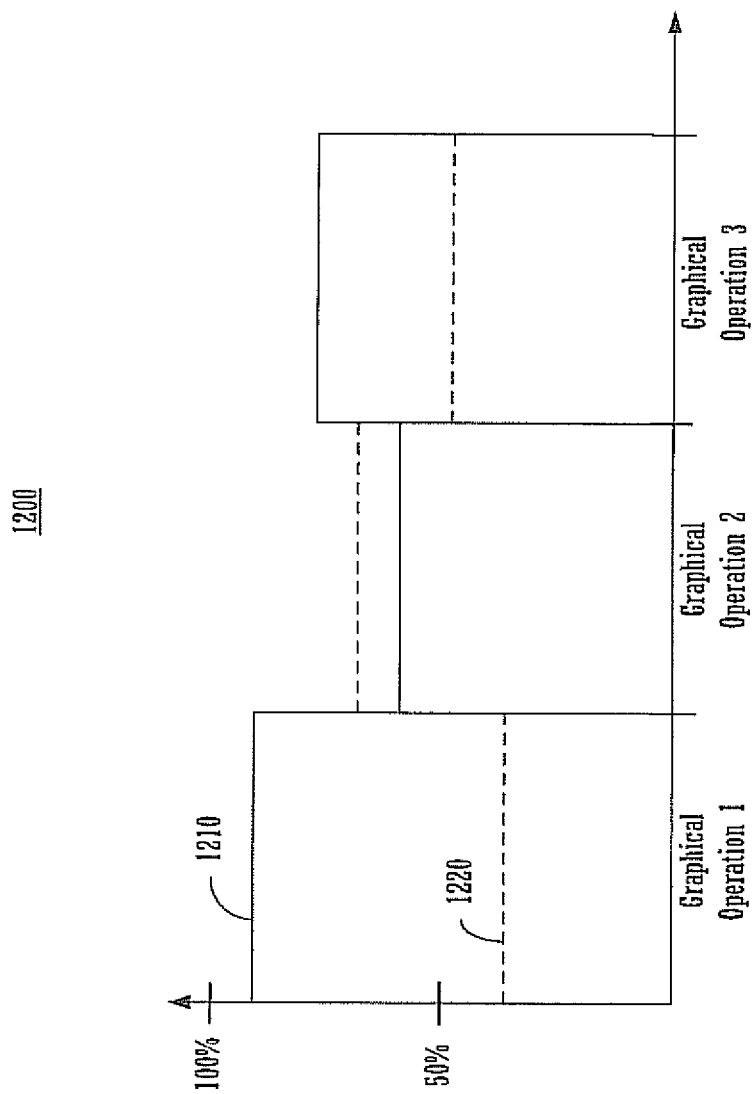
FIG. 12 shows exemplary data flow impedance information in percentages for bottleneck analysis in accordance with one embodiment of the present invention.

FIGS. 11 and 12 show exemplary data flow impedance information 1100 and 1200 for bottleneck analysis in accordance with one embodiment of the present invention. Since the speed and amount of data flowing through a graphics pipeline determines the performance of a graphical application processed by the graphics pipeline, it is important to know which pipeline unit if any is impeding the flow of data (e.g., forming a bottleneck to the graphics pipeline) to effectively make performance improvements to the graphical application. As such, user interface 900 is operable to display data flow impedance information 1100 and/or 1200 (e.g., in display are 960) to enable graphics pipeline bottleneck analysis for the processing of one or more graphical operations.

As shown in FIG. 11, bottleneck analysis for a plurality of graphical operations is expressed in units of time. Information subset 1110 represents an execution duration for a plurality of graphical operations, where the plurality of graphical operations may comprise a graphical frame, a state grouping of graphical operations with similar state attributes and/or an identified graphical operation (e.g., chosen from the frame and/or state grouping). For example, bar 1112 represents an execution duration for graphical operations of an entire frame, whereas bar 1114 represents an execution duration for an identified graphical operation (e.g., identified using portions of user interface 900 of FIG. 9). Additionally, bar 1116 represents an execution duration for a state grouping of graphical operations, where the state grouping may include the identified graphical operation to which bar 1114 corresponds.

As shown in FIG. 11, information subset 1120 represents data flow impedance information expressed in units of time for specific units (e.g., the vertex assembly unit, vertex shader unit, pixel shader unit, texture unit and raster operations unit) of the graphics processing pipeline. For example, bar 1122 represents a duration for which the ROP unit (e.g., 250 of FIG. 2) impeded the flow of data through the graphics processing pipeline (e.g., 200 of FIG. 2) when executing a plurality of graphical operations comprising a graphical frame. Bar 1124 represents a duration for which the ROP unit impeded the flow of data through the graphics processing pipeline when executing a plurality of graphical operations comprising an identified graphical operation (e.g., identified using portions of user interface 900 of FIG. 9). Additionally, bar 1126 represents a duration for which the ROP unit impeded the flow of data through the graphics processing pipeline when executing a plurality of graphical operations comprising a state grouping of graphical operations, where the state grouping may include the identified graphical operation to which bar 1124 corresponds. And as shown in FIG. 11, information subset 1120 may include similar data flow impedance information for other units of the graphics pipeline (e.g., vertex assembly unit, vertex shader unit, pixel shader unit, texture unit, etc.).

In one embodiment, data flow impedance duration for a specific pipeline unit may be calculated in accordance with the following equation:

$$T_{DFI} = T_1 + T_2 - T_3$$

Accordingly, the data flow impedance duration ($T_{DFI}$) is the sum of $T_1$ and $T_2$ minus $T_3$. $T_1$ represents a time period in which the specific pipeline unit is active (e.g., operating on data, etc.), whereas $T_2$ represents a time period in which the pipeline unit is full. $T_3$ represents a time period when the specific pipeline unit is paused and unable to transfer data due to an inability of another pipeline unit to receive data. Additionally, $T_{DFI}$, $T_1$, $T_2$ and $T_3$ may be gathered and computed as described in U.S. patent application Ser. No. 11/497,863, filed Aug. 1, 2006, entitled "A METHOD AND SYSTEM FOR CALCULATING PERFORMANCE PARAMETERS FOR A PROCESSOR," naming Raul Aguaviva, Jeffrey Kiel and Sebastien Domine as inventors, assigned to the assignee of the present invention, which is hereby incorporated by reference.

Although specific subsets of information are shown in FIG. 11, it should be appreciated that the information may be alternatively presented in other embodiments. For example, a larger or smaller number of execution duration and/or data flow impedance bars may be included for each pipeline unit in other embodiments. Additionally, information for a larger or smaller number of pipeline units may be presented in other embodiments. Moreover, although information 1100 is presented as a bar graph, it should be appreciated that the information may be alternatively presented (e.g., using a line graph, pie chart, scatter plot, etc.) in other embodiments.

As shown in FIG. 12, data flow impedance information 1200 is expressed in units of percentage (e.g., bottleneck percentage) for a plurality of graphical operations, where a bottleneck percentage for a specific pipeline unit may be the data flow impedance duration for the specific pipeline unit divided by an execution duration for the plurality of graphical operations (e.g., as expressed by information subset 1110 of FIG. 11). The plurality of graphical operations may comprise a graphical frame, a state grouping of graphical operations with similar state attributes and/or an identified graphical operation (e.g., identified using portions of user interface 900 of FIG. 9). The identified graphical operation may be one of the graphical operations comprising the frame and/or state grouping.

As shown in FIG. 12, the solid bars (e.g., 1210) represent bottleneck percentages for a first pipeline unit over a plurality of graphical operations (e.g., graphical operation 1, graphical operation 2 and graphical operation 3). The dashed bars (e.g., 1220) represent bottleneck percentages for a second pipeline unit over a plurality of graphical operations (e.g., graphical operation 1, graphical operation 2 and graphical operation 3). As such, FIG. 12 shows simultaneous data flow impedance information in the form of bottleneck percentage for multiple pipeline units for the execution of a plurality of graphical operations.

In one embodiment, bottleneck percentage for a specific pipeline unit may be calculated in accordance with the following equation:

$$B_\% = \frac{T_1 + T_2 - T_3}{T_4}$$

Accordingly, the bottleneck percentage (B %) is the sum of $T_1$ and $T_2$ minus $T_3$, where this quantity is divided by $T_4$. $T_1$ represents a time period in which the specific pipeline unit is active (e.g., operating on data, etc.), whereas $T_2$ represents a time period in which the pipeline unit is full. $T_3$ represents a time period when the specific pipeline unit is paused and unable to transfer data due to an inability of another pipeline unit to receive data. $T_4$ represents an execution duration for a plurality of graphical operations. Additionally, B %, $T_1$, $T_2$, $T_3$ and $T_4$ may be gathered and computed as described in U.S. patent application Ser. No. 11/497,863, filed Aug. 1, 2006, entitled "A METHOD AND SYSTEM FOR CALCULATING PERFORMANCE PARAMETERS FOR A PROCES- SOR," naming Raul Aguaviva, Jeffrey Kiel and Sebastien Domine as inventors, assigned to the assignee of the present invention, which is hereby incorporated by reference.

Although FIG. 12 presents data flow impedance information for only two pipeline units, it should be appreciated that a larger or smaller number of pipeline units may be presented in other embodiments. Additionally, although FIG. 12 presents data flow impedance information for only three graphical operations, it should be appreciated that a larger or smaller number of graphical operations may be presented in other embodiments.

Figure 13:
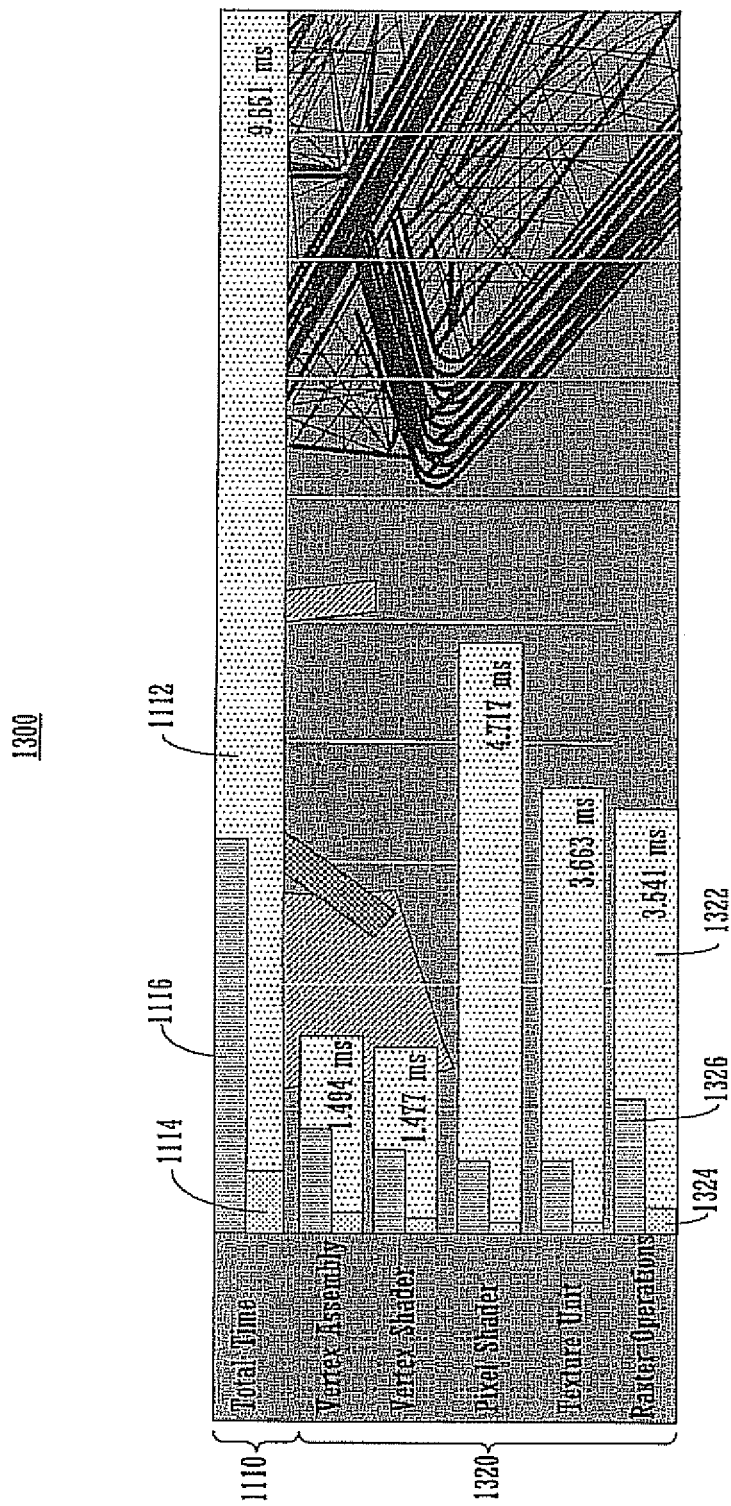
FIG. 13 shows exemplary graphics pipeline unit utilization information in units of time for utilization analysis in accordance with one embodiment of the present invention.
Figure 14:
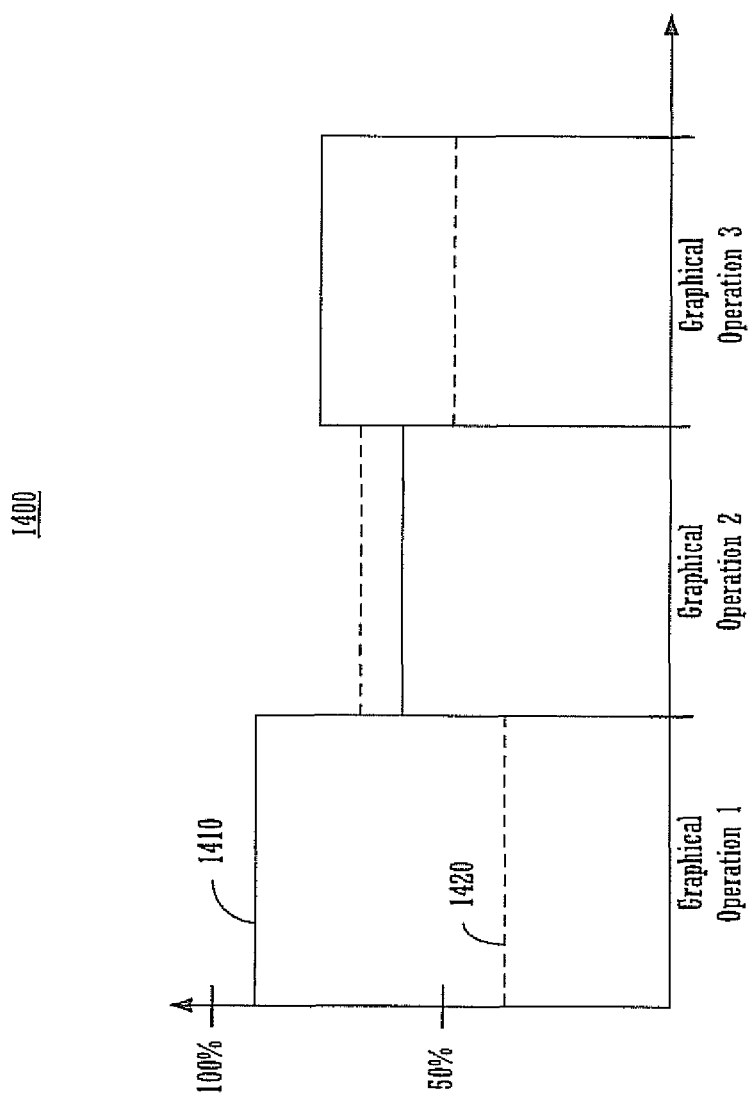
FIG. 14 shows exemplary graphics pipeline unit utilization information in percentages for utilization analysis in accordance with one embodiment of the present invention.

FIGS. 13 and 14 show exemplary graphics pipeline unit utilization information 1300 and 1400 for unit utilization analysis in accordance with one embodiment of the present invention. Since the speed and amount of data flowing through a graphics pipeline determines the performance of a graphical application processed by the graphics pipeline, it is important to know which pipeline unit if any is underutilized to effectively make performance improvements to the graphical application. As such, user interface 900 is operable to display data flow impedance information 1300 and/or 1400 (e.g., in display are 960) to enable graphics pipeline utilization analysis for the processing of one or more graphical operations.

As shown in FIG. 13, utilization analysis for a plurality of graphical operations is expressed in units of time. Information subset 1110 represents an execution duration for a plurality of graphical operations as explained above with respect to FIG. 11, where the plurality of graphical operations may comprise a graphical frame (e.g., as represented by bar 1112), a state grouping of graphical operations with similar state attributes (e.g., as represented by bar 1116) and/or an identified graphical operation (e.g., as represented by bar 1114).

As shown in FIG. 13, information subset 1320 represents utilization information expressed in units of time for specific units (e.g., the vertex assembly unit, vertex shader unit, pixel shader unit, texture unit and raster operations unit) of the graphics processing pipeline. For example, bar 1322 represents a duration for which the ROP unit (e.g., 250 of FIG. 2) is utilized when executing a plurality of graphical operations comprising a graphical frame. Bar 1324 represents a duration for which the ROP unit is utilized when executing a plurality of graphical operations comprising an identified graphical operation (e.g., identified using portions of user interface 900 of FIG. 9). Additionally, bar 1326 represents a duration for which the ROP unit is utilized when executing a plurality of graphical operations comprising a state grouping of graphical operations, where the state grouping may include the identified graphical operation to which bar 1324 corresponds. And as shown in FIG. 13, information subset 1320 may include similar data flow impedance information for other units of the graphics pipeline (e.g., vertex assembly unit, vertex shader unit, pixel shader unit, texture unit, etc.).

Although specific subsets of information are shown in FIG. 13, it should be appreciated that the information may be alternatively presented in other embodiments. For example, a larger or smaller number of execution duration and/or utilization bars may be included for each pipeline unit in other embodiments. Additionally, information for a larger or smaller number of pipeline units may be presented in other embodiments. Moreover, although information 1300 is presented as a bar graph, it should be appreciated that the information may be alternatively presented (e.g., using a line graph, pie chart, scatter plot, etc.) in other embodiments.

As shown in FIG. 14, data flow impedance information 1400 is expressed in units of percentage (e.g., utilization percentage) for a plurality of graphical operations, where a utilization percentage for a specific pipeline unit may be the utilization duration for the specific pipeline unit divided by an execution duration for the plurality of graphical operations (e.g., as expressed by information subset 1110 of FIG. 13). The plurality of graphical operations may comprise a graphical frame, a state grouping of graphical operations with similar state attributes and/or an identified graphical operation (e.g., identified using portions of user interface 900 of FIG. 9). The identified graphical operation may be one of the graphical operations comprising the frame and/or state grouping.

As shown in FIG. 14, the solid bars (e.g., 1410) represent utilization percentages for a first pipeline unit over a plurality of graphical operations (e.g., graphical operation 1, graphical operation 2 and graphical operation 3). The dashed bars (e.g., 1420) represent utilization percentages for a second pipeline unit over a plurality of graphical operations (e.g., graphical operation 1, graphical operation 2 and graphical operation 3). As such, FIG. 14 shows simultaneous utilization information in the form of utilization percentage for multiple pipeline units for the execution of a plurality of graphical operations.

In one embodiment, utilization percentage for a specific pipeline unit may be calculated in accordance with the following equation:

$$U_\% = \frac{T_1}{T_4}$$

Accordingly, the utilization percentage (U %) is $T_1$ divided by $T_4$. $T_1$ represents a time period in which the specific pipeline unit is active (e.g., operating on data, etc.). $T_4$ represents an execution duration for a plurality of graphical operations.

Additionally, U %, $T_1$ and $T_4$ may be gathered and computed as described in U.S. patent application Ser. No. 11/497,863, filed Aug. 1, 2006, entitled "A METHOD AND SYSTEM FOR CALCULATING PERFORMANCE PARAMETERS FOR A PROCESSOR," naming Raul Aguaviva, Jeffrey Kiel and Sebastien Domine as inventors, assigned to the assignee of the present invention, which is hereby incorporated by reference.

Although FIG. 14 presents utilization information for only two pipeline units, it should be appreciated that a larger or smaller number of pipeline units may be presented in other embodiments. Additionally, although FIG. 14 presents utilization information for only three graphical operations, it should be appreciated that a larger or smaller number of graphical operations may be presented in other embodiments.

Figure 15:
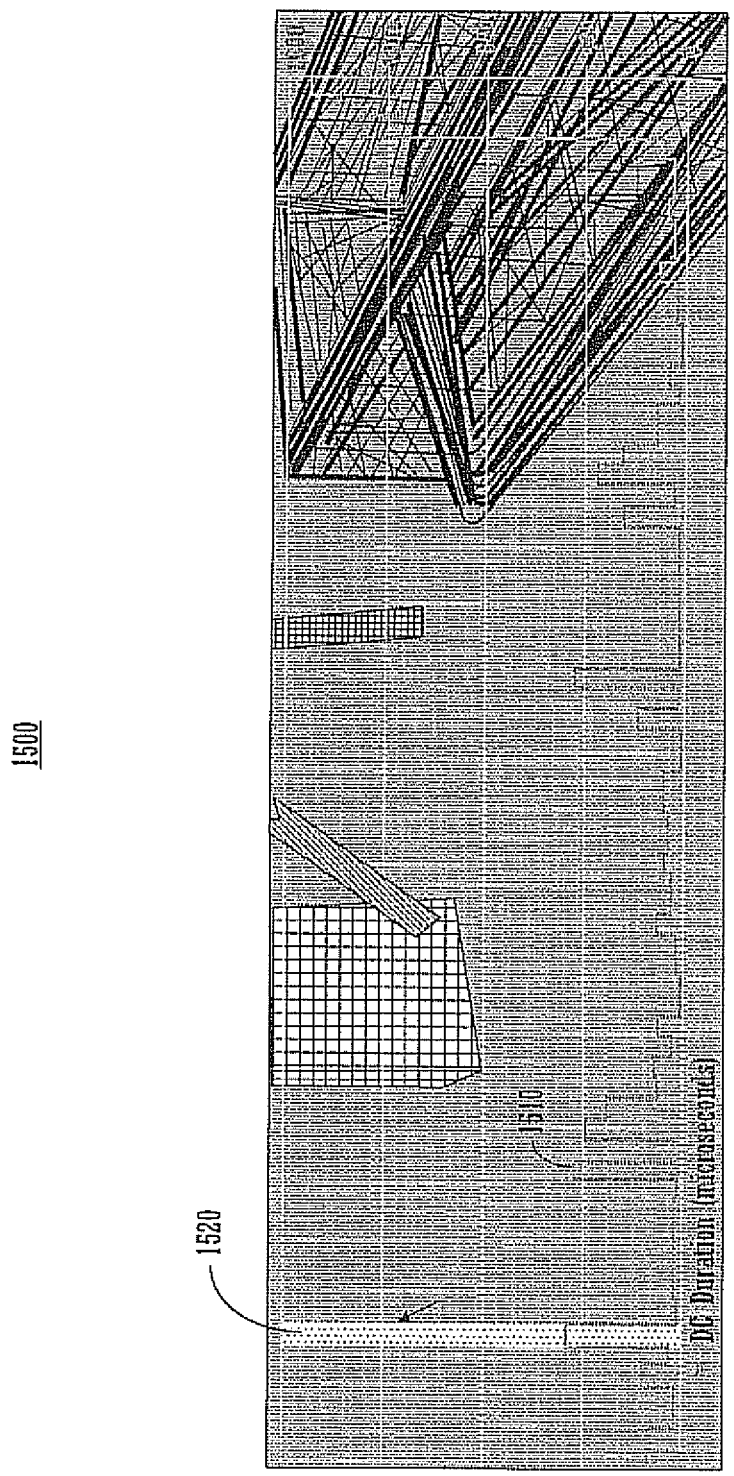
FIG. 15 shows exemplary execution duration information for graphical operations in accordance with one embodiment of the present invention.

FIG. 15 shows exemplary execution duration information 1500 for graphical operations in accordance with one embodiment of the present invention. As shown in FIG. 15, a plurality of execution duration bars (e.g., 1510) are presented for a plurality of graphical operations, where each execution duration bar represents an execution duration for a corresponding graphical operation. The plurality of graphical operations may comprise a graphical frame, a state grouping of graphical operations with similar state attributes and/or an identified graphical operation (e.g., identified using portions of user interface 900 of FIG. 9). Highlighted portion 1520 may depict an identified graphical operation, and may shift its position over information 1500 to reflect a newly identified graphical operation. Additionally, in one embodiment, the execution duration for each graphical operation may be expressed in microseconds.

Figure 16:
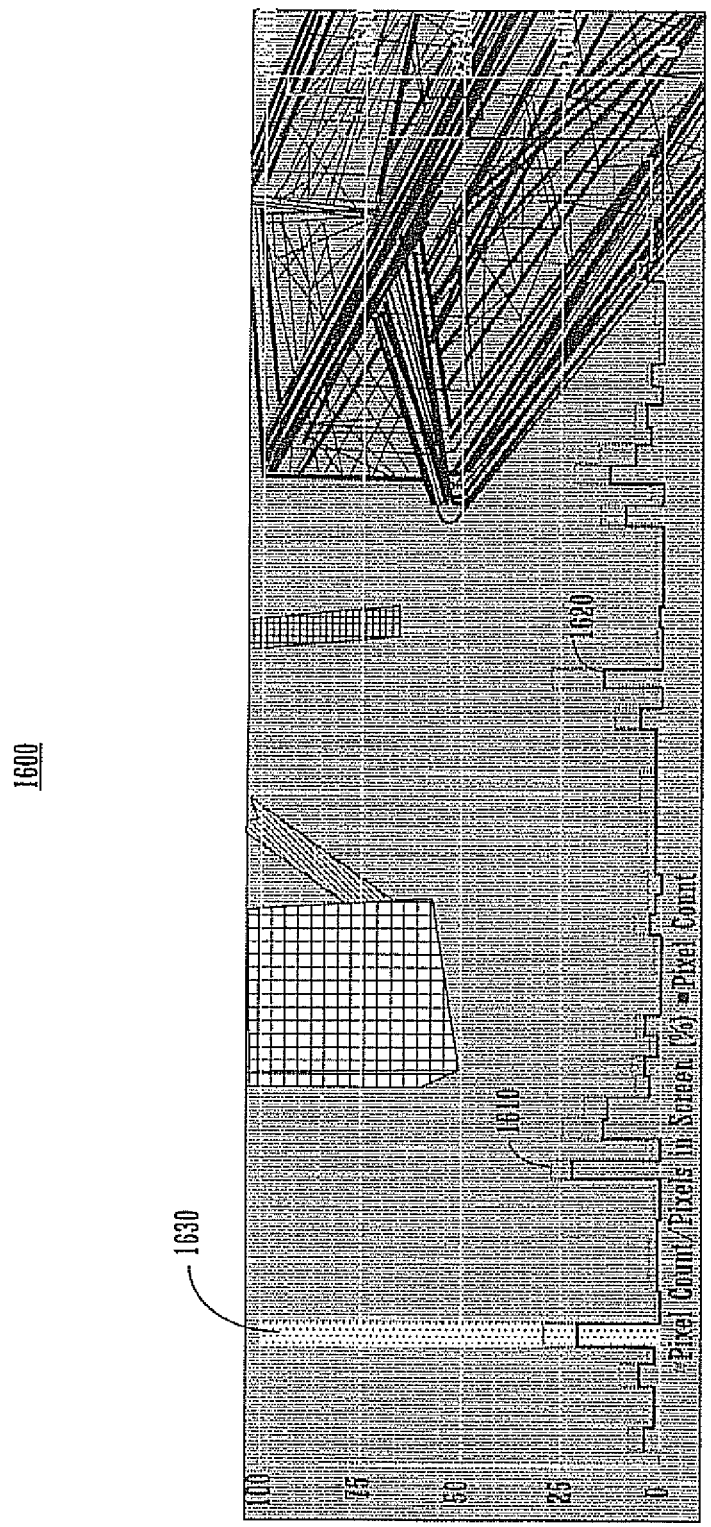
FIG. 16 shows exemplary shaded pixel information for graphical operations in accordance with one embodiment of the present invention.

FIG. 16 shows exemplary shaded pixel information 1600 for graphical operations in accordance with one embodiment of the present invention. As shown in FIG. 16, a plurality of pixel quantity bars (e.g., 1610) are presented for a plurality of graphical operations, where each pixel quantity bar represents a pixel quantity for a corresponding graphical operation. A plurality of pixel quantity percentage bars (e.g., 1620) are presented for a plurality of graphical operations, where each pixel quantity percentage bar represents a pixel quantity percentage for a corresponding graphical operation. The pixel quantity percentage may be calculated by dividing a pixel quantity for the graphical operation by a total number of pixels (e.g., in a rendered image displayed on a display device, a display area in pixels, etc.). Additionally, the plurality of graphical operations may comprise a graphical frame, a state grouping of graphical operations with similar state attributes and/or an identified graphical operation (e.g., identified using portions of user interface 900 of FIG. 9). Highlighted portion 1630 may depict an identified graphical operation, and may shift its position over information 1600 to reflect a newly identified graphical operation.

Figure 17:
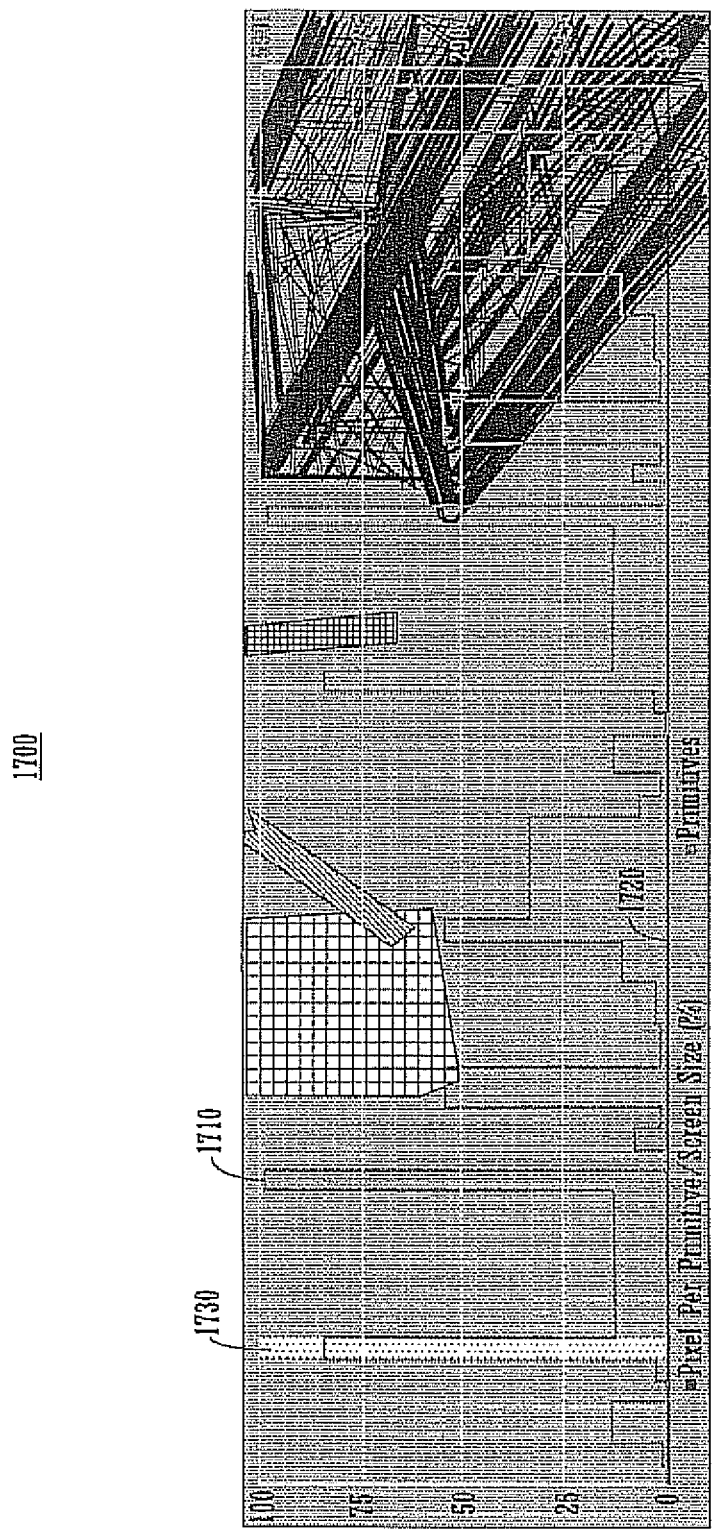
FIG. 17 shows exemplary graphical object quantity information for graphical operations in accordance with one embodiment of the present invention.

FIG. 17 shows exemplary graphical object quantity information 1700 for graphical operations in accordance with one embodiment of the present invention. As shown in FIG. 17, a plurality of graphical object (e.g., primitives, etc.) quantity bars (e.g., 1710) are presented for a plurality of graphical operations, where each graphical object quantity bar represents a graphical object quantity for a corresponding graphical operation. A plurality of pixel quantity per graphical object percentage bars (e.g., 1720) are presented for a plurality of graphical operations, where each pixel quantity per graphical object percentage bar represents a pixel quantity per graphical object for a corresponding graphical operation. The pixel quantity per graphical object percentage may be calculated by dividing a pixel quantity per graphical object for the graphical operation by a total number of pixels (e.g., in a rendered image displayed on a display device, a display area in pixels, etc.). Additionally, the plurality of graphical operations may comprise a graphical frame, a state grouping of graphical operations with similar state attributes and/or an identified graphical operation (e.g., identified using portions of user interface 900 of FIG. 9). Highlighted portion 1730 may depict an identified graphical operation, and may shift its position over information 1700 to reflect a newly identified graphical operation.

Figure 18:
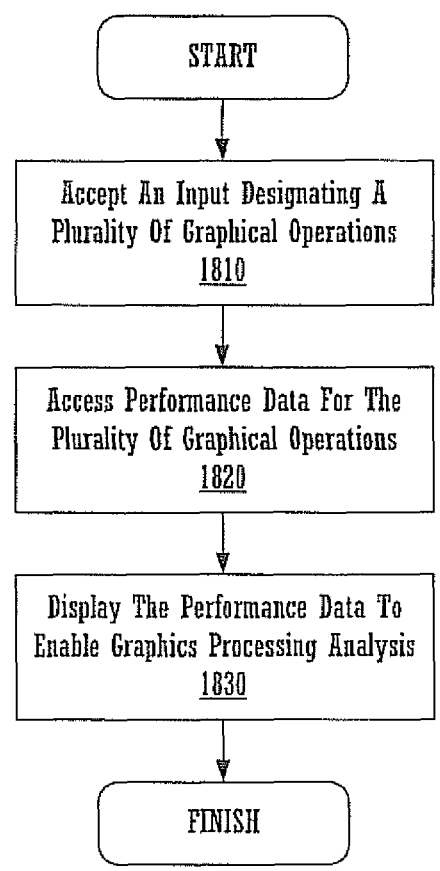
FIG. 18 shows an exemplary computer-implemented process for displaying performance information associated with graphical operations in accordance with one embodiment of the present invention.

FIG. 18 shows exemplary computer-implemented process 1800 for displaying performance information associated with graphical operations in accordance with one embodiment of the present invention. As shown in FIG. 18, step 1810 involves accepting a first input designating a plurality of graphical operations. The first input may be by a manual (e.g., by a user) or automatic (e.g., by a hardware or software component) selection of a plurality of graphical operations as discussed above with respect to FIG. 9. Additionally, the plurality of graphical operations may comprise a graphical frame, a state grouping of graphical operations with similar state attributes and/or an identified graphical operation. The identified graphical operation may be a graphical operation of the graphical frame and/or the state grouping of graphical operations.

Step 1820 involves accessing performance data for the plurality of graphical operations. The performance data may comprise data flow impedance information (e.g., as described with respect to FIGS. 11 and 12). Alternatively, the performance data may comprise utilization information (e.g., as described with respect to FIGS. 13 and 14). In other embodiments, the performance data may comprise execution duration information (e.g., as described with respect to FIGS. 9 and 15), pixel quantity information (e.g., as described with respect to FIG. 16) and/or graphical object quantity information (e.g., as described with respect to FIG. 17).

After accessing the performance data for the plurality of graphical operations, the performance data may be displayed in step 1830 to enable graphics processing analysis of an application for which the performance data was obtained. The performance data may be displayed in one or more display areas (e.g., 960 of FIG. 9) of a user interface (e.g., 900 of FIG. 9). In one embodiment, the performance data may be displayed as shown in FIGS. 11 through 17. In other embodiments, the performance data may be alternatively displayed by combining different types of data to display and/or presenting the data in a different form (e.g., using other graphs, charts, etc.).

What is claimed is:

1. A computer-implemented user interface comprising:
 a first region operable to display a plurality of groups of graphical operations, wherein each group of said plurality of groups of graphical operations is associated with a respective state grouping of a plurality of state groupings, and wherein said first region allows a selection of a group of graphical operations from said plurality of groups of graphical operations; and
 a second region operable to display performance data associated with said group of said plurality of graphical operations responsive to said selection, wherein said performance data is organized into a plurality of groups of performance data, and wherein each group of said plurality of groups of performance data is associated with a respective unit of a plurality of units of a graphics processing pipeline, and wherein said performance data indicates a degree to which a unit of said graphics processing pipeline impedes a flow of data through said graphics processing pipeline responsive to an execution of said group of said plurality of graphical operations.

2. The computer-implemented user interface of claim 1, wherein said performance data is associated with a degree to which said unit forms a bottleneck to said flow of data through said graphics processing pipeline, and wherein said degree is displayed in units selected from a group consisting of a time period and a percentage.

3. The computer-implemented user interface of claim 1, wherein said group of said graphical operations is selected from a group consisting of graphical operations with similar state attributes and graphical operations associated with a graphical frame.

4. The computer-implemented user interface of claim 1, wherein said plurality of groups of graphical operations are displayed in said first region contemporaneously with said performance data in said second region.

5. The computer-implemented user interface of claim 1 further comprising:
 a slider element, and wherein said selection is input using said slider element.

6. The computer-implemented user interface of claim 1 further comprising:
 a plurality of elements, and wherein said selection is input using at least one of said plurality of elements.

7. The computer-implemented user interface of claim 1, wherein said second region is operable to contemporaneously display multiple depictions of said performance data, and wherein said group of said plurality of graphical operations is selected from a group consisting of graphical operations with similar state attributes and graphical operations associated with a graphical frame.

8. The computer-implemented user interface of claim 1 further comprising:
   a third region operable to display a rendered result of said group of said plurality of graphical operations by said graphics processing pipeline, and wherein said rendered result is updated responsive to said selection.

9. A computer-implemented user interface comprising:
   a first region operable to display a plurality of groups of graphical operations, wherein each group of said plurality of groups of graphical operations is associated with a respective state grouping of a plurality of state groupings, and wherein said first region allows a selection of a group of graphical operations from said plurality of groups of graphical operations; and
   a second region operable to display performance data associated with said group of said plurality of graphical operations responsive to said selection, wherein said performance data is organized into a plurality of groups of performance data, and wherein each group of said plurality of groups of performance data is associated with a respective unit of a plurality of units of a graphics processing pipeline, and wherein said performance data indicates utilization information for a unit of said graphics processing pipeline responsive to an execution of said group of said plurality of graphical operations.

10. The computer-implemented user interface of claim 9, wherein said utilization information is associated with a quantity of usage of said unit during an execution of said group of said plurality of graphical operations.

11. The computer-implemented user interface of claim 10, wherein said group of said plurality of graphical operations is selected from a group consisting of graphical operations with similar state attributes and graphical operations associated with a graphical frame.

12. The computer-implemented user interface of claim 9, wherein said utilization information is displayed in units selected from a group consisting of a time period and a percentage.

13. The computer-implemented user interface of claim 9, wherein said plurality of groups of graphical operations are displayed in said first region contemporaneously with said performance data in said second region.

14. The computer-implemented user interface of claim 9 further comprising:
   a slider element, and wherein said selection is input using said slider element.

15. The computer-implemented user interface of claim 9 further comprising:
   a plurality of elements, and wherein said selection is input using at least one of said plurality of elements.

16. The computer-implemented user interface of claim 9, wherein said second region is operable to contemporaneously display multiple depictions of said performance data, and wherein said group of said plurality of graphical operations is selected from a group consisting of graphical operations with similar state attributes and graphical operations associated with a graphical frame.

17. The computer-implemented user interface of claim 9 further comprising:
   a third region operable to display a rendered result of said group of said plurality of graphical operations by said graphics processing pipeline, and wherein said rendered result is updated responsive to said selection.

18. A computer-implemented method of graphical processing analysis, said method comprising:
   accessing a selection of a group of graphical operations, wherein said group of graphical operations is associated with a state grouping;
   accessing performance data associated with said plurality of graphical operations, wherein said performance data is organized into a plurality of groups of performance data, and wherein each group of said plurality of groups of performance data is associated with a respective unit of a plurality of units of a graphics processing pipeline, and wherein said performance data is related to a processing of said plurality of graphical operations by a unit of said graphics processing pipeline; and
   displaying said performance data.

19. The computer-implemented method of claim 18, wherein said group of graphical operations share a plurality of common state attributes, and wherein said plurality of common state attributes define a programmable state associated with said unit.

20. The computer-implemented method of claim 18, wherein said performance data is associated with information selected from a group consisting of a degree to which said unit impedes a flow of data through said graphics processing pipeline and utilization of said unit during an execution of said group of graphical operations.

21. The computer-implemented method of claim 18 further comprising:
   displaying a rendered result of said group of graphical operations.

* * * * *